(12) United States Patent
Martyn

(10) Patent No.: US 9,528,579 B2
(45) Date of Patent: Dec. 27, 2016

(54) APPARATUS FOR CONVERTING MOTION AND BUILDING ASSEMBLY COMPRISING THE SAME

(71) Applicant: Ten Fold Engineering Limited, Buckinghamshire (GB)

(72) Inventor: David Martyn, Bath (GB)

(73) Assignee: Ten Fold Engineering Limited (GB)

( * ) Notice: Subject to any disclaimer, the term of this patent is extended or adjusted under 35 U.S.C. 154(b) by 0 days.

(21) Appl. No.: 14/891,795

(22) PCT Filed: May 15, 2014

(86) PCT No.: PCT/GB2014/000190
§ 371 (c)(1),
(2) Date: Nov. 17, 2015

(87) PCT Pub. No.: WO2014/184513
PCT Pub. Date: Nov. 20, 2014

(65) Prior Publication Data
US 2016/0102740 A1 Apr. 14, 2016

(30) Foreign Application Priority Data

May 17, 2013 (GB) .................................. 1308900.8

(51) Int. Cl.
*E04B 1/346* (2006.01)
*F16H 21/44* (2006.01)
(Continued)

(52) U.S. Cl.
CPC ............. *F16H 21/44* (2013.01); *E04B 1/3441* (2013.01); *E04B 1/3444* (2013.01); *E04B 1/3445* (2013.01); *F16H 21/04* (2013.01)

(58) Field of Classification Search
CPC ........ F16H 21/44; F16H 21/04; E04B 1/3445; E04B 1/3444; E04B 1/3441
(Continued)

(56) References Cited

U.S. PATENT DOCUMENTS 893,068 A * 7/1908 Gay ........................ F16H 21/44
74/110
3,375,624 A * 4/1968 Mikulin .................... E04B 1/19
52/109
(Continued)

FOREIGN PATENT DOCUMENTS

FR 2557003 A1 6/1985
SU 654818 A1 3/1979
(Continued)

OTHER PUBLICATIONS

Patents Act 1977: Search Report under Section 17, based on Application No. GB1308900.8, Nov. 4, 2013, 1 page.

*Primary Examiner* — Basil Katcheves
(74) *Attorney, Agent, or Firm* — Jason Saunders; Arnold, Knobloch & Saunders, L.L.P.

(57) ABSTRACT

An assembly for converting motion comprises a first rotatable arm; a second rotatable arm; a third arm pivotably connected to the second arm; a fourth arm pivotably connected to the second arm; a fifth arm; a first connecting arm extending between the first arm and the third arm, pivotably connected to first arm and the third arm; a second connecting arm extending between the first and second arms, pivotably connected to the first arm and to the second arm; a third connecting arm extending between the first and fourth arms and the fourth and fifth arms, pivotably connected to the first arm, pivotably connected to the fourth arm, and pivotably connected to the fifth arm; and a fourth connecting arm pivotably connected to each of the fourth and fifth arms; the (Continued)

Figure 2A:
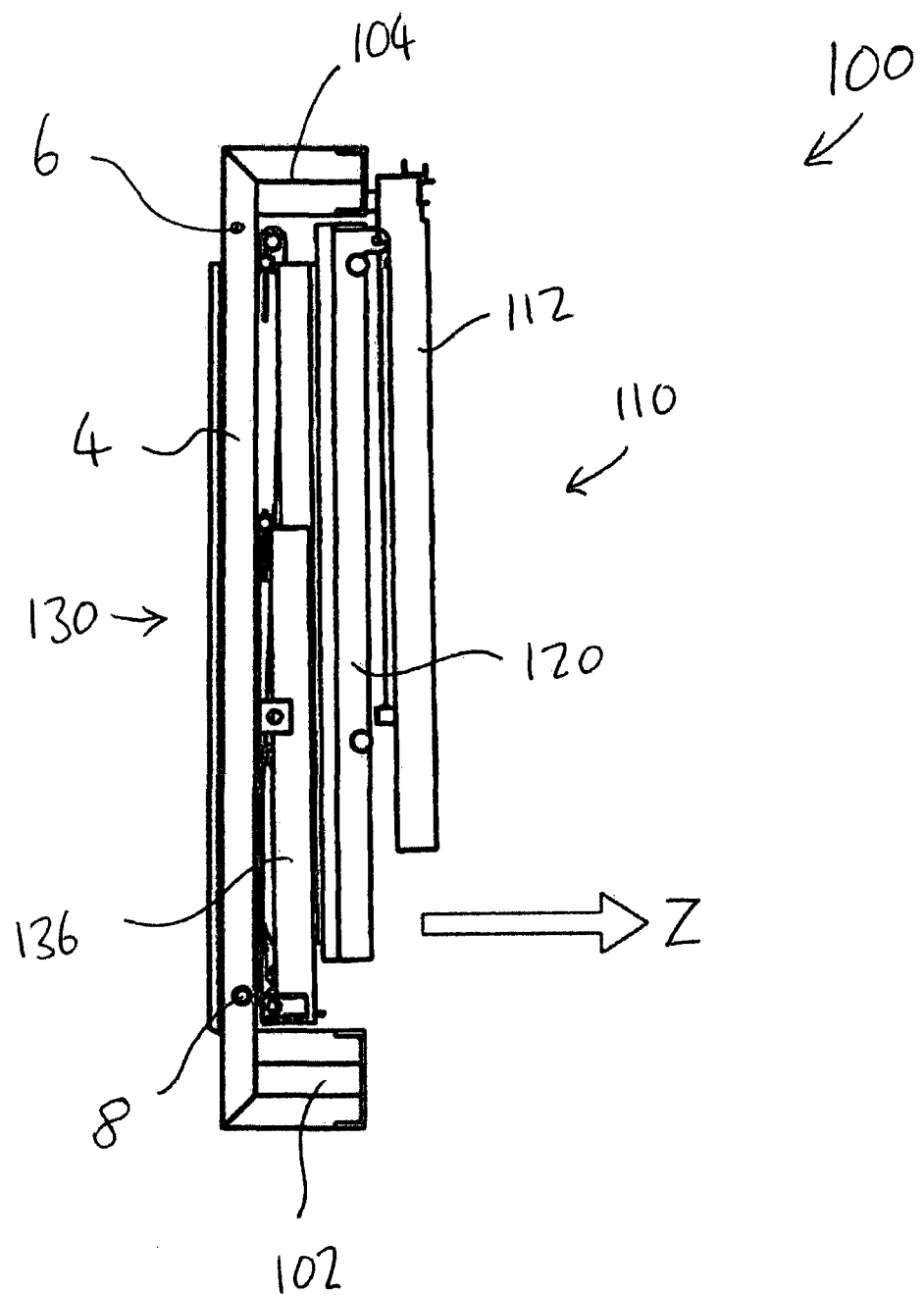

fifth arm pivotably connected to the third connecting arm and mounted to an object to be moved.

20 Claims, 14 Drawing Sheets

(51) Int. Cl.
*F16H 21/04* (2006.01)
*E04B 1/344* (2006.01)

(58) Field of Classification Search
USPC .................................. 52/69, 64, 71, 109
See application file for complete search history.

(56) References Cited

U.S. PATENT DOCUMENTS

| | | | |
|---|---|---|---|
| 3,470,981 A * | 10/1969 | Huxley | B66F 11/044 |
| | | | 182/141 |
| 3,867,845 A | 2/1975 | Antuma | |
| 3,877,544 A * | 4/1975 | McCollum | B66F 11/044 |
| | | | 182/141 |
| 4,248,103 A | 2/1981 | Halsall | |
| 4,400,985 A | 8/1983 | Bond | |
| 4,583,907 A * | 4/1986 | Wimberley | B66F 9/065 |
| | | | 414/685 |
| 4,747,353 A | 5/1988 | Watt | |
| 4,989,914 A | 2/1991 | Pine | |
| 5,102,290 A | 4/1992 | Cipolla | |
| 5,237,887 A | 8/1993 | Appleberry | |
| 5,669,517 A * | 9/1997 | Donaldson | B66F 11/046 |
| | | | 212/196 |
| 6,325,591 B1 * | 12/2001 | Focke | B65B 5/105 |
| | | | 414/713 |
| 2002/0179598 A1 * | 12/2002 | Kuhn | E04B 1/3444 |
| | | | 220/1.5 |
| 2006/0070306 A1 * | 4/2006 | Lin | E04B 1/3444 |
| | | | 52/67 |
| 2006/0201072 A1 * | 9/2006 | Gibson | E04B 1/3444 |
| | | | 52/69 |

FOREIGN PATENT DOCUMENTS

| | | |
|---|---|---|
| WO | 9733725 A1 | 9/1997 |
| WO | 9814018 A1 | 4/1998 |
| WO | 2014029954 A2 | 2/2014 |

* cited by examiner

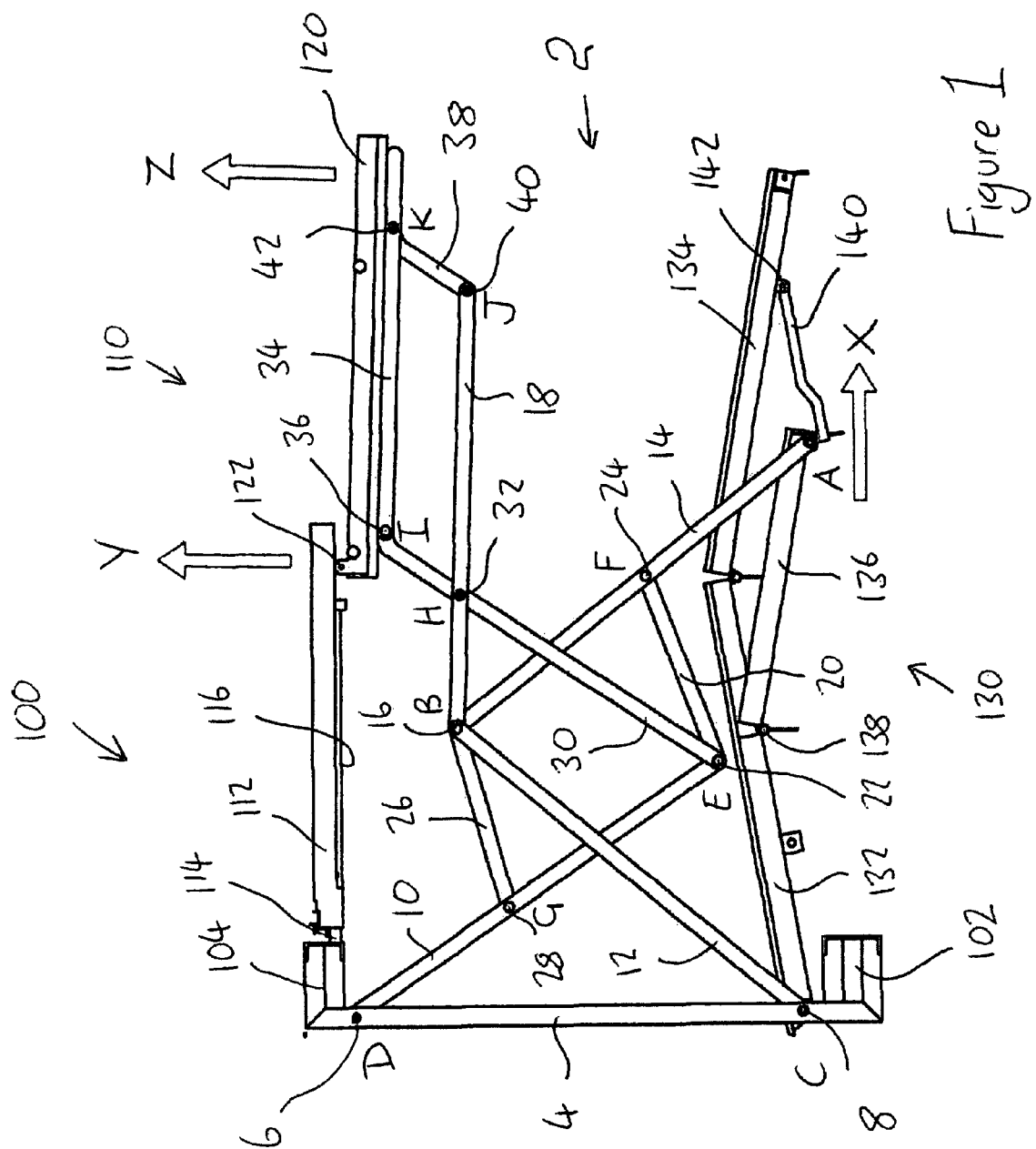

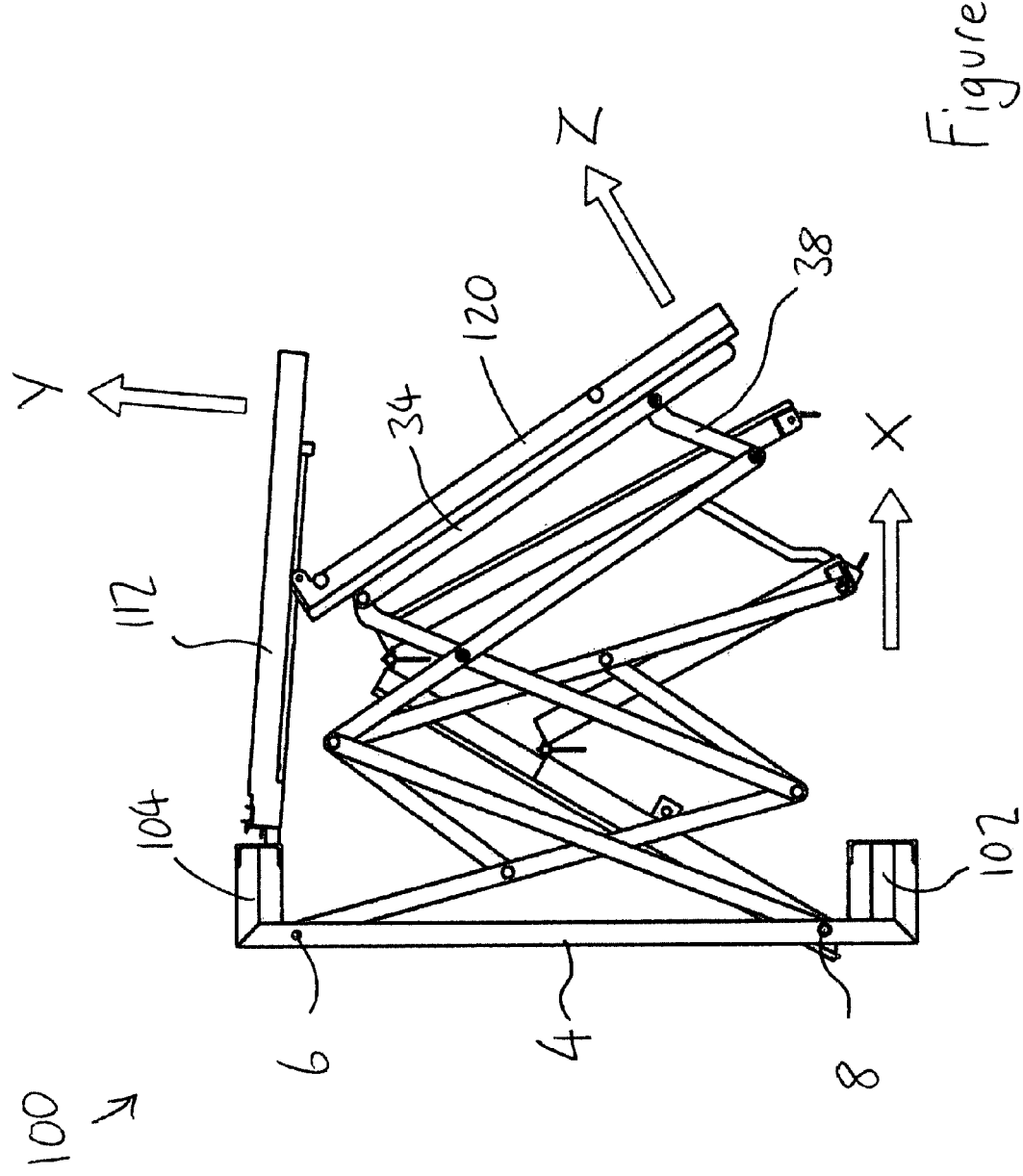

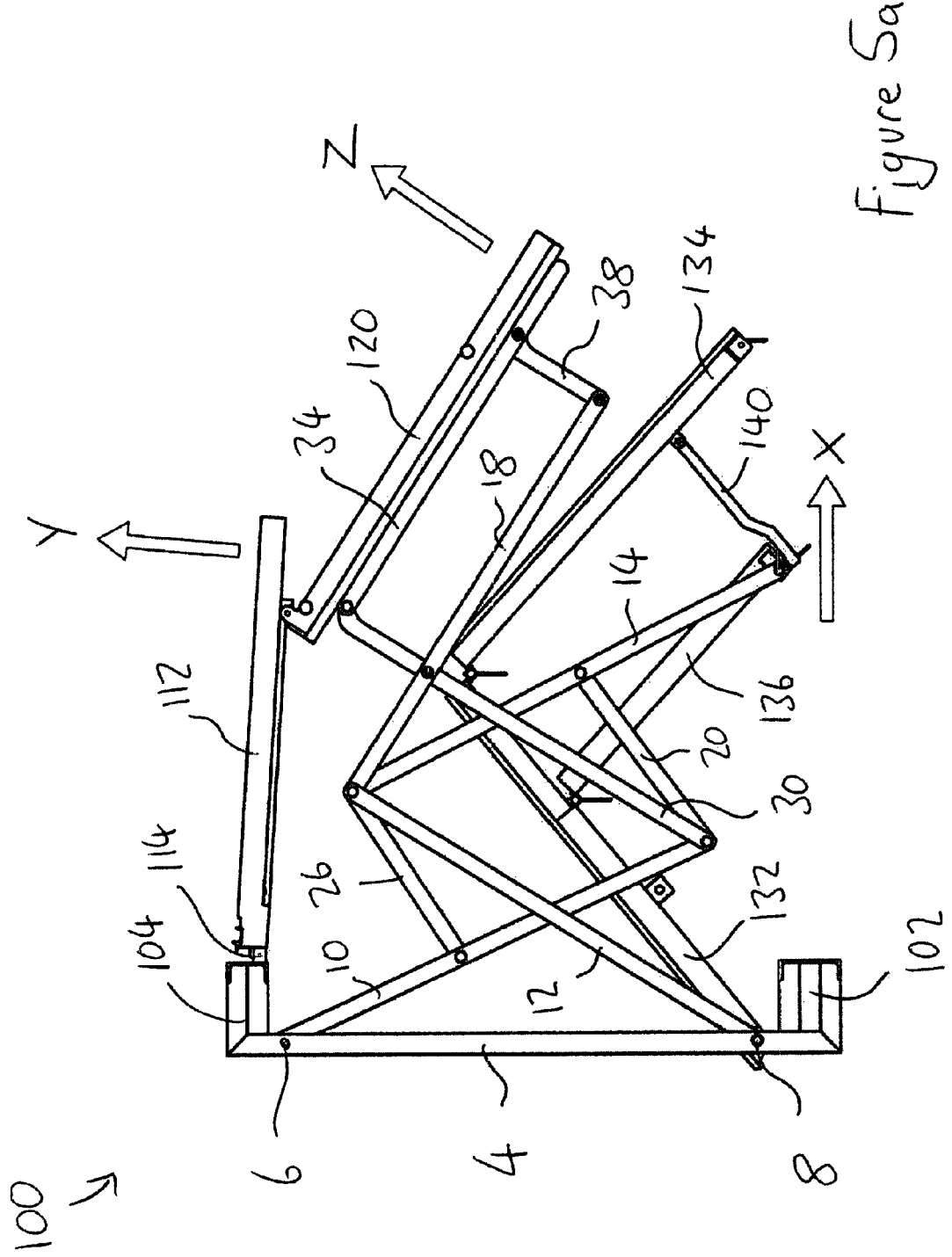

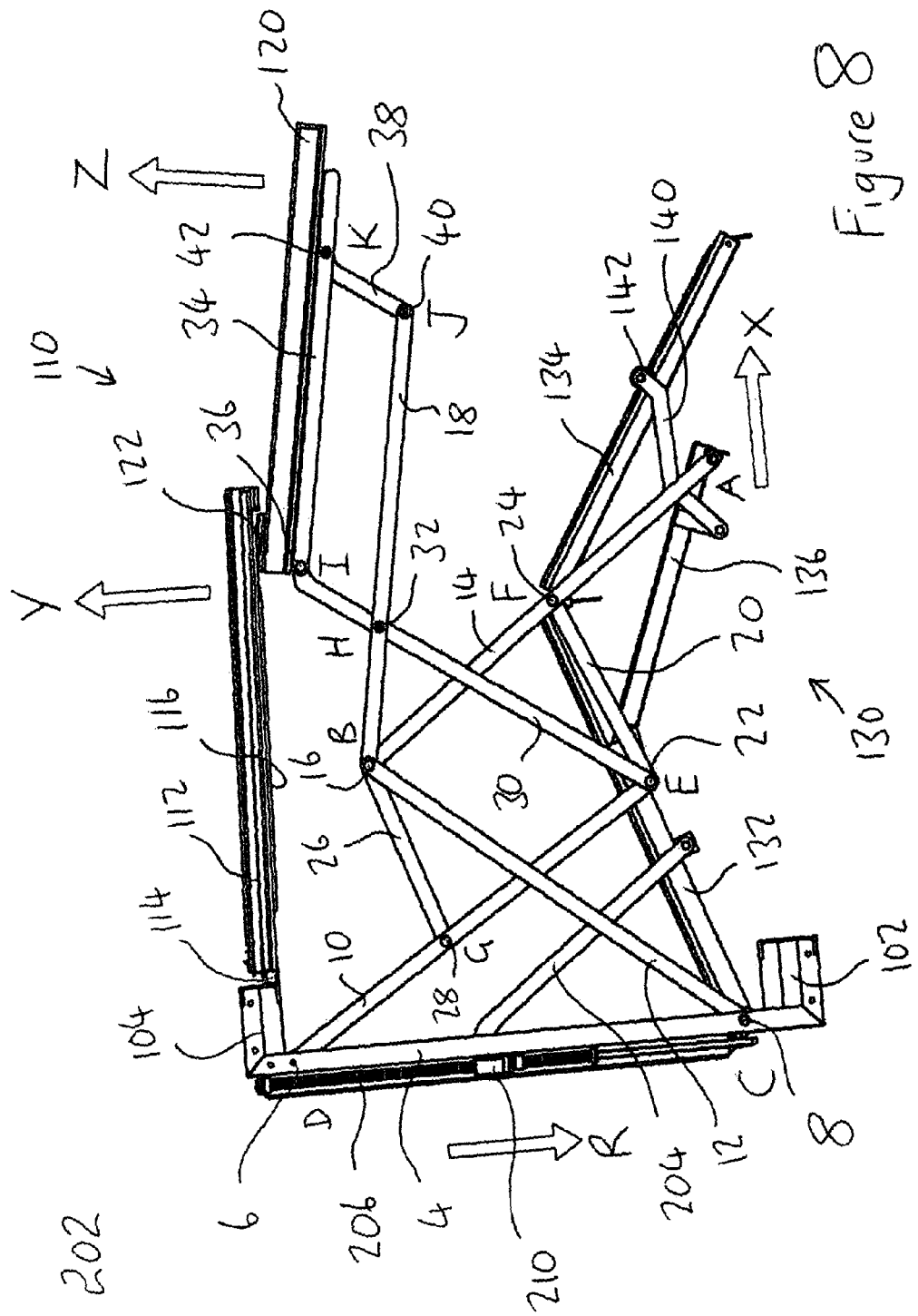

APPARATUS FOR CONVERTING MOTION AND BUILDING ASSEMBLY COMPRISING THE SAME

The present invention relates to an apparatus for converting motion. In one aspect, the apparatus may be used to producing a straight line motion, in particular an apparatus for producing motion of a component in a straight line generated by the rotational movement of a second component or the motion of the second component about a pivot. In a further aspect, the apparatus may be used to both displace and rotate a first component with respect to a second component. The apparatus finds use, for example, in an expandable building assembly.

Mechanisms for converting motion, in particular producing a straight line motion from a rotational motion are known in the art. Such straight line mechanisms may be characterised by comprising a first member rotatable about an axis passing through the member and a second member linked to or associated with the first member, the arrangement being such that rotational movement of the first member about the axis results in a straight line movement of the second member.

Examples of early mechanisms for producing a straight line motion include the straight line mechanism design by James Watt, comprising a series of three levers in end-to-end configuration, with movement of the two end levers about pivots at their free ends causing the middle lever to follow a close approximation to a straight line over a portion of its movement. A related linkage comprising three levers, with the middle lever constrained to follow a straight line was proposed by Tchebicheff. The Peaucellier-Lipkin inversor consists of an arrangement of seven levers and provides a conversion of circular motion into linear motion and vice versa. A related four-lever mechanism was proposed by Hart. A linear converter, known as the half beam mechanism, in which a first linear motion is converted to a second linear motion perpendicular to the first, was designed by Scott Russell.

An analysis of a variety of multi-lever, straight line linkages is provided by Dijksman, E. A. 'Advances in Robot Kinematics and Computationed Geometry', pages 411 to 420, [1994] Kluwer Academic Publishers.

U.S. Pat. No. 3,867,845 discloses a device for converting a rotary movement into a symmetrical reciprocating movement. The device is based on two triangular arrangements of arms.

A lever assembly for reproducing curves is disclosed in SU 654818.

FR 2557003 discloses a transfer mechanism, in particular for use in a robot.

U.S. Pat. No. 4,248,103 discloses a straight line mechanism, in particular a mechanism of the so-called 'conchoid' type. There is disclosed a linkage mechanism for an industrial manipulator comprising at least two of the said straight line mechanisms.

U.S. Pat. No. 4,400,985 concerns a straight line link mechanism, comprising a plurality of pivotally connected links. The links are connected between a support and a controlled member. As one of the links is moved in a 360° arc, the controlled member alternately moves in a first direction along a linear path and thereafter in the opposite direction along a curved path. The weight of the controlled member may be balanced by the use of a counter weight, to provide a lifting mechanism. A cam may be employed to control the motion of the controlled member.

More recently, U.S. Pat. No. 4,747,353 discloses a straight line motion mechanism formed from a pair linkage mechanisms arranged in a parallelogram in combination with a motion control means. The motion control means interconnects the two linkage mechanisms and provide a uniform angular displacement of each linkage mechanism.

U.S. Pat. No. 5,102,290 concerns a transfer device for transferring a workpiece from a first location to a second location. The workpiece is moved in a trochoidal arc by means of a pickup arm mounted to roll along a flat surface.

A straight line mechanism is disclosed in U.S. Pat. No. 5,237,887. The mechanism comprises a static base and a platform supported by first and second arm assemblies. Each of the first and second arm assemblies comprises portions pivotally connected to the static base. The arrangement of the pivoted arm portions of each arm assembly is such that the platform is constrained to move in a straight line, as the portions of the arms move about their respective pivot connections.

Still more recently, WO 97/33725 discloses a device for the relative movement of two elements. The device comprises at least two first links connected to a first element by a hinged connection so as to form a four-hinge system and pivot in a plane parallel to the plane of the first element. At least two second links are connected to the second element so as to form a four-hinge system and to pivot in a plane parallel to the plane of the second element. The two four-hinge systems provided by the first and second links are coupled in series to allow relative motion of the first and second elements.

WO 99/14018 discloses a device for the relative movement of two elements. The device comprises at least two link devices coupled between the elements, each comprising two mutually articulated link units. A first link unit is connected to first, moveable element. The second of the link units is connected to the second, static element. Power applied to the link units causes the first element to move relative to the second.

There is a need for an improved assembly for providing a straight line motion, in particular for providing an element moveable in a straight line in response to a rotational motion. It would be most advantageous if the assembly could be arranged in a compact form, thereby occupying only a small volume of space.

An assembly for converting a rotary motion into a straight line motion comprising an assembly of five levers or arms having pivoted connections therebetween is disclosed in pending GB patent applications Nos. GB1209982.6 entitled 'Apparatus for converting motion' and GB1214929.0 entitled 'Apparatus for converting motion'. An alternative assembly for providing both linear motion and a rotational motion has now been found comprising seven pivotally connected levers or arms.

According to the present invention, there is provided an assembly for converting motion, the assembly comprising:

a first arm rotatable at a first position thereon about a first fixed pivot;

a second arm rotatable at a first position thereon about a second fixed pivot, the second fixed pivot spaced apart from the first fixed pivot;

a third arm pivotably connected at a first position thereon to the second arm at a second position on the second arm, the second position spaced apart from the first position on the second arm;

a fourth arm pivotably connected at a first position thereon to the second arm at a third position on the second arm;

a fifth arm;

a first connecting arm extending between the first arm and the third arm, the first connecting arm pivotably connected to a second position on the first arm spaced apart from the first position and pivotably connected to the third arm at a second position thereon spaced apart from the first position thereon;

a second connecting arm extending between the first arm and the second arm, the second connecting arm pivotably connected to a third position on the first arm disposed between the first and second positions thereon and pivotably connected to a fourth position on the second arm at a third position thereon;

a third connecting arm extending between the first arm and the fourth arm and between the fourth arm and the fifth arm, the third connecting arm pivotably connected to a fourth position on the first arm, pivotably connected to a third position on the fourth arm, and pivotably connected to a first position on the fifth arm; and a fourth connecting arm pivotably connected at a first position thereon to the fourth arm at a second position on the fourth arm and pivotably connected at a second position thereon to the fifth arm at a second position on the fifth arm;

the fifth arm pivotably connected at a second position thereon to the third connecting arm;

the fifth arm being mounted to an object to be moved.

The assembly of the present invention provides an improved an advantageous means for moving one object relative to another object. In particular the assembly extends from one side of the line joining the two fixed pivots on a first of the objects, resulting in minimal or zero encroachment of the assembly into the space within the first object. Further, the second object, when moved relative to the first object is moved ahead of the assembly. Again, this is a particularly compact and efficient manner to move the second object.

In operation of the assembly, rotation of the first arm about the first fixed pivot results in rotation of the second arm about the second fixed pivot and movement of the third arm. In particular, the third arm is caused to move such that a point on the third arm (herein referred to as 'the said point') spaced from the first position on the third arm and located such that the second position on the third arm lies between the said point and the first position moves in a straight line. Thus, rotational motion of the first arm and the second arm about their respective fixed pivots results in a straight line motion of the said point on the third arm. In this respect, it is to be noted that the said point on the third arm referred to traces a line that is substantially straight, that is represents a very close approximation to a straight line. In particular, the path followed by the said point may be characterised as being a very flat sine wave, that is a sine wave of high wavelength and very low amplitude.

The point on the third arm referred to above is spaced from the first position on the third arm, with the second position on the third arm lying between the said point and the first position. The location of the said point will depend upon the length of the arms of the device and the positions of their interconnections. In one preferred embodiment, the said point is arranged to be at a distal location on the third arm, that is distal from the first and second positions on the third arm, preferably with the said point being located at the free end of the third arm or in an end portion at the free end of the arm.

The extent of the straight line motion of the said point on the third arm varies according the precise positioning of the connections between the arms. For example, in one embodiment, it has been found that this close approximation to a straight line motion by the said point on the third arm occurs over a distance that is up to 85% of the distance between the first and second fixed pivots. Further embodiments provide motion of the said point on the third arm that follows a close approximation to a straight line for a distance up to or exceeding 100% of the distance between the first and second fixed pivots. References herein to a motion of the said point on the third arm in a 'straight line' are references to this movement.

As noted, the said point on the third arm moves in a pattern that is a close approximation to a straight line. The deviation of the movement of the said point from a straight line may be exemplified by the following:

In an embodiment of the assembly in which the distance between the first fixed pivot and the second fixed pivot is 3250 mm, the said point on the third arm describes an approximate straight line of 2750 mm in length. In particular, the said point moves between a retracted position and a first extended position. In this respect, references to motion of the said point are with respect to the line joining the first and second fixed pivots, with the retracted position being at or close to the line joining the first and second fixed pivots and the retracted position being distant therefrom. As noted, the said point on the third arm moves between the retracted position and the first extended position, with the line joining the retracted and first extended positions being a straight line substantially perpendicular to the line extending between the first and second pivots. However, in moving between the retracted and first extended positions, the said point follows a sine wave having a maximum deviation from the straight line of 8 mm. This deviation represents a deviation of just 0.25% of the distance travelled by the said point between the retracted and extended positions and is generally insignificant in the context of most if not all practical applications of the assembly.

In another embodiment of the assembly in which the distance between the first fixed pivot and the second fixed pivot is 3250 mm, the said point on the third arm describes an approximate straight line of 3254 mm in length. In this embodiment, the deviation of the said point moves in a sine wave having a maximum deviation from a straight line of just 31.4 mm, that is just 0.96% of the distance travelled by the said point.

The arrangement of the assembly of the present invention may be varied depending upon the requirements. For example, the assembly may be arranged to provide a longer straight line movement of the said point on the third arm with a slightly greater deviation from a straight line. Alternatively, the assembly may be arranged to provide a shorter straight line movement of the said point, with the path traced by the said point being a closer approximation to a straight line with less deviation.

When moving between the retracted and the first extended positions, the said point on the third arm follows a substantially straight line. Other points on the third arm follow a respective arc.

As noted above, the assembly of the present invention provides a motion of the said point on the third arm that follows a straight line over a specific extent of its movement. The close approximation of the movement of the said point on the third arm to a straight line between the retracted and first extended positions makes the assembly of the present invention particularly useful as a straight line converter, that is able to convert a rotational movement of the first and/or second arms about the first and second fixed pivots respectively, into a straight line motion of the said point on the third arm. However, the operation of the assembly is not limited to this extent of movement of the third arm. Rather, continued movement of the assembly beyond the first extended position to a super-extended position causes the third arm to move to a position that is along a line that is perpendicular to the line joining the first and second fixed pivots, with the position displaced from this line. This movement of the third arm away from the line joining the first and second fixed pivots with simultaneous rotation of the third arm, once beyond the first extended position, is also particularly useful, for example in deploying items connected to the third arm away from the line joining the first and second fixed pivots. Indeed, it has been found that the third arm may be moved to a position in which it extends at any desired angle to the line joining the first and second pivots, in particular up to and including perpendicular to the line. In addition, the third arm may be moved beyond this position perpendicular to the line joining the first and second pivots, if required.

In one preferred embodiment, the movement of the third arm is limited such that the said point on the third arm is confined to moving in a straight line. In this way, an object connected to the third arm at the said point is able to be moved or deployed in a straight line between the retracted position and the first extended position. It is particularly advantageous that this movement or deployment of the object connected to the said point on the third arm is perpendicular to the line extending between the first and second pivots.

The assembly further comprises a fourth arm, connected to the second arm, as summarised above. In operation of the assembly, rotation of the first arm about the first fixed pivot results in rotation of the second arm about the second fixed pivot and movement of the fourth arm. In particular, the fourth arm is caused to move in a motion similar to that of the third arm, that is such that a point on the fourth arm (herein referred to again as 'the said point') spaced from the first position on the fourth arm and located such that the second position on the fourth arm lies between the said point and the first position moves in a straight line. Thus, rotational motion of the first arm and the second arm about their respective fixed pivots results in a straight line motion of the said point on the fourth arm. In this respect, it is to be noted that the said point on the fourth arm referred to traces a line that is substantially straight, that is represents a very close approximation to a straight line. In particular, the path followed by the said point on the fourth arm may be characterised as being a very flat sine wave, that is a sine wave of high wavelength and very low amplitude.

The said point on the fourth arm referred to above is spaced from the first position on the fourth arm, with the second position on the fourth arm lying between the said point and the first position. The location of the said point will depend upon the length of the arms of the device and the positions of their interconnections. In one preferred embodiment, the said point is arranged to be at a distal location on the fourth arm, that is distal from the first and second positions on the fourth arm, preferably with the said point being located at the free end of the fourth arm or in an end portion at the free end of the arm.

The extent of the straight line motion of the said point on the fourth arm varies according the precise positioning of the connections between the arms, as with the third arm described above. For example, in one embodiment, it has been found that this close approximation to a straight line motion by the said point on the fourth arm occurs over a distance that is up to 85% of the distance between the first and second fixed pivots. Further embodiments provide motion of the said point on the fourth arm that follows a close approximation to a straight line for a distance up to or exceeding 100% of the distance between the first and second fixed pivots. References herein to a motion of the said point on the fourth arm in a 'straight line' are references to this movement.

As noted, the said point on the fourth arm moves in a pattern that is a close approximation to a straight line. The deviation of the movement of the said point from a straight line may be exemplified by the following:

In an embodiment of the assembly in which the distance between the first fixed pivot and the second fixed pivot is 3250 mm, the said point on the fourth arm describes an approximate straight line of 2750 mm in length. In particular, the said point moves between a retracted position and a second extended position. In this respect, references to motion of the said point on the fourth arm are with respect to the line joining the first and second fixed pivots, with the retracted position being at or close to the line joining the first and second fixed pivots and the retracted position being distant therefrom. As noted, the said point on the fourth arm moves between the retracted position and the second extended position, with the line joining the retracted and second extended positions being a straight line substantially perpendicular to the line extending between the first and second pivots. However, in moving between the retracted and second extended positions, the said point follows a sine wave having a maximum deviation from the straight line of 8 mm. This deviation represents a deviation of just 0.25% of the distance travelled by the said point between the retracted and second extended positions and is generally insignificant in the context of most if not all practical applications of the assembly.

In another embodiment of the assembly in which the distance between the first fixed pivot and the second fixed pivot is 3250 mm, the said point on the fourth arm describes an approximate straight line of 3254 mm in length. In this embodiment, the deviation of the said point moves in a sine wave having a maximum deviation from a straight line of just 31.4 mm, that is just 0.96% of the distance travelled by the said point.

The arrangement of the assembly of the present invention may be varied depending upon the requirements. For example, the assembly may be arranged to provide a longer straight line movement of the said point on the fourth arm with a slightly greater deviation from a straight line. Alternatively, the assembly may be arranged to provide a shorter straight line movement of the said point, with the path traced by the said point being a closer approximation to a straight line with less deviation.

When moving between the retracted and the extended positions, the said point on the fourth arm follows a substantially straight line. Other points on the fourth arm follow a respective arc.

Continued movement of the assembly beyond the second extended position to a super-extended position causes the fourth arm to move to a position that is perpendicular to and displaced from the line joining the first and second fixed pivots. This movement of the fourth arm away from the line joining the first and second fixed pivots with simultaneous rotation of the fourth arm, once beyond the extended position, is also particularly useful, for example in deploying items connected to the fourth arm away from the line joining the first and second fixed pivots. Indeed, it has been found that, as with the third arm, the fourth arm may be moved to a position in which it extends at any desired angle to the line joining the first and second pivots, in particular up to and including perpendicular to the line. In addition, the fourth arm may be moved beyond the position perpendicular to the line joining the first and second pivots, if required.

As described hereinafter, the fifth arm is connected to an object to be moved or deployed. The position of the object when in the extended position is determined by the length and/or position of each of the fourth arm, the fifth and the fourth connecting arm. As described hereinafter, in one preferred embodiment, the object is substantially horizontal when in the extended position. The assembly may be arranged such that the fourth arm is extending parallel to the object in the extended position, for example substantially horizontally.

It will be appreciated that the angle of the third arm with respect to the line joining the first and second pivots and the angle of the fourth arm with respect to the line joining the first and second pivots are different at each position of the assembly, once the assembly is moved from the retracted position.

As noted above, the motion of the third and fourth arms may be varied by the length of the other components of the assembly. The relative positions and angles of the third and fourth arms at different positions in the movement of the assembly from the retracted position may also be varied by appropriate selection of the length of the other components of the assembly.

In one particularly preferred embodiment, the assembly is arranged such that the said point on the third arm moves in a straight line, as described above, throughout the duration of the movement of the fourth arm from the retracted position to the super-extended position in which the fourth arm extends substantially perpendicular to the line joining the first and second pivots.

It has been found that the aforementioned assembly provides a number of significant advantages. First, the points of the assembly on the third and fourth arms that trace a straight line move away from the mechanism, in particular away from the line joining the first and second fixed pivots. As noted, the assembly may be considered to be movable from a retracted position to a plurality of extended positions, with a point on the third arm moving in a straight line between the retracted position and a first extended position and a point on the fourth arm moving in a straight line between the retracted position and a second extended position.

The said points on each of the third and fourth arms move in a straight line away from the retracted position to the extended positions. In particular, the assembly is such that, in operation, a point on the fourth arm traces a straight line to the first extended position that extends away from the first and second fixed pivot points, in particular from the line joining the first and second pivot points. Similarly, a point on the third arm traces a straight line to the second extended position that extends away from the first and second fixed pivot points, in particular from the line joining the first and second pivot points. More particularly, in many embodiments, the straight line path followed by each of the said points on the third and fourth arms extends perpendicular to the line joining the first and second pivot points. This is an advantage over assemblies of the prior art and allows the assembly of the present invention to be more versatile and have a wider range of applications. In particular, it allows the assembly to be placed or mounted on a plane and to have all motion of the components confined to one side of the plane. Thus, for example, the assembly may be used on an exterior surface of a construction, such as a building or the like, and all components move from the retracted to the extended positions on the exterior, without encroaching on or requiring space on the interior side of the surface.

Further, the arms of the assembly may be constructed such that the arms may be accommodated one within another. The components of the assembly may be arranged such that, when in the retracted position, the third, fourth, fifth and sixth arms and the first and second connecting arms are accommodated within or adjacent the first and second arms, thereby providing for a particularly compact assembly when in the retracted position.

The assembly has been defined hereinbefore by reference to a plurality of arms. It is to be understood that the term 'arm' is used as a general reference to any component that may be connected as hereinbefore described and/or moved about a fixed pivot. Accordingly, the term 'arm' is to be understood as being a reference to any such component, regardless of shape or configuration. In a preferred embodiment, the arms are elongate members, in particular formed to allow the arms to be accommodated within one another, as described above.

As noted, operation of the assembly results in motion of the third and fourth arms. It is to be understood that the assembly may be used to convert a rotational motion of the first or second arms about the first or second fixed pivots into motion of the said points on the third and fourth arms, that is by having drive to the assembly provided at the first or second arms. Alternatively, the assembly may be used to convert a motion of the third arm or the fourth arm, for example a linear motion, into a rotational motion of the first and second arms, that is by having drive to the assembly applied at one or both of the third or fourth arms.

The assembly of the present invention comprises a first arm. The first arm may have any shape and configuration. A preferred form for the first arm is an elongate member, for example a bar or a rod. The first arm is pivotably mounted at a first position on the arm to a first fixed pivot. The pivotable connection at the first position may be of any suitable form, preferably a pin, spindle or axle passing through the arm about which the arm is free to move.

The first arm may function as a driving arm for the assembly, that is have a force applied thereto so as to rotate the arm about the fixed pivot at the first position on the arm, thereby transferring drive to the other components of the assembly. Alternatively, the first arm may be a driven arm of the assembly, that is move about the fixed pivot under the action of the other components of the assembly. The assembly of the present invention is particularly advantageous when the first arm operates as a driving arm.

The first position on the first arm may be at any suitable location thereon. In one preferred embodiment, the first position is at or adjacent the first end of the first arm.

The assembly further comprises a second arm. The second arm may have any shape and configuration. A preferred form for the second arm is an elongate member, for example a bar or a rod. The second arm is pivotably mounted at a first position on the second arm to a second fixed pivot. The pivotable connection at the first position may be of any suitable form, preferably a pin, spindle or axle passing through the arm about which the arm is free to move.

The second arm may function as a driving arm for the assembly, that is have a force applied thereto so as to rotate the arm about the fixed pivot at the first position on the arm, thereby transferring drive to the other components of the assembly. Alternatively, the second arm may be a driven arm of the assembly, that is move about the fixed pivot under the action of the other components of the assembly. The assembly of the present invention is particularly advantageous when the second arm operates as a driving arm.

The first position may be in any suitable location on the second arm. In one preferred embodiment, the first position is at or adjacent one end of the second arm.

The assembly further comprises a third arm. The third arm may have any shape and configuration. A preferred form for the third arm is an elongate member, for example a bar or a rod. The third arm is pivotably mounted at a first position on the third arm to the second arm. The pivotable connection between the second and third arms may be of any suitable form, preferably a pin, spindle or axle passing through the arms about which one or both of the arms are free to move.

The third arm is pivotably connected to the second arm at a first position on the third arm and a second position on the second arm. The first position may be in any suitable location on the third arm. In one preferred embodiment, the first position is at or adjacent one end of the third arm.

The second position on the second arm is spaced apart from the first position on the second arm. In one preferred embodiment, the second position on the second arm is at or adjacent the second end of the second arm.

In operation of the assembly, as noted above, the third arm has a point thereon that follows the path of a straight line when the assembly is moved between the retracted and first extended positions. This point on the third arm is spaced apart from the first position on the third arm, that is the position on the third arm at which the second and third arms are pivotably connected together. The location of this point on the third arm will depend upon aspects of the geometry of the other components of the assembly and the location of their interconnections, in particular the lengths of the first and second arms and the first and second connecting arms. In one preferred arrangement, the said point is disposed at or adjacent the second end of the third arm.

The third arm may be a driven arm, that is moved under the action of movement of the first and second arms. In this case, rotation of the first arm about the first fixed pivot and/or the second arm about the second fixed pivot causes the third arm to move, such that the said point on the third arm follows the straight line path between the retracted and first extended positions. Alternatively, the third arm may be a driving arm, that is have a force applied thereto resulting in movement of the third arm, which in turn drives the other components of the assembly to result in movement of the first arm about the first fixed pivot and motion of the second arm about the second fixed pivot. For example, application of a straight line force to the said point on the third arm between the retracted and first extended positions results in rotational movement of the first and second arms about their respective fixed pivots.

As noted above, the assembly further comprises a fourth arm. As with the first, second and third arms, the fourth arm may have any shape and configuration. A preferred form for the fourth arm is an elongate member, for example a bar or a rod. The fourth arm is pivotably mounted at a first position on the fourth arm to the second arm. The pivotable connection between the second and fourth arms may be of any suitable form, preferably a pin, spindle or axle passing through the arms about which one or both of the arms are free to move.

The fourth arm is pivotably connected to the second arm at a first position on the fourth arm and a third position on the second arm. The first position may be in any suitable location on the fourth arm. In one preferred embodiment, the first position is at or adjacent one end of the fourth arm.

The third position on the second arm is spaced apart from the first position on the second arm. In one preferred embodiment, the third position on the second arm is at or adjacent the second end of the second arm. It is particularly preferred that the third position on the second arm is coincident with the second position on the second arm, that is the third and fourth arms are pivotally connected to the second arm at the same location on the second arm, most preferably at or adjacent an end of the second arm.

In operation of the assembly, as noted above, the fourth arm has a point thereon that follows the path of a straight line when the assembly is moved between the retracted and the second extended positions. This point on the fourth arm is spaced apart from the first position on the fourth arm, that is the position on the fourth arm at which the second and fourth arms are pivotably connected together. The location of this point on the fourth arm will depend upon aspects of the geometry of the other components of the assembly and the location of their connections, in particular the lengths of the various arms, in particular the first and second arms and the second and third connecting arms. In one preferred arrangement, the said point is disposed at or adjacent the second end of the fourth arm.

The fourth arm may be a driven arm, that is moved under the action of movement of the first and second arms. In this case, rotation of the first arm about the first fixed pivot and/or the second arm about the second fixed pivot causes the fourth arm to move, such that the said point on the fourth arm follows the straight line path between the retracted and second extended positions. Alternatively, the fourth arm may be a driving arm, that is have a force applied thereto resulting in movement of the fourth arm, which in turn drives the other components of the assembly to result in movement of the first arm about the first fixed pivot and motion of the second arm about the second fixed pivot. For example, application of a straight line force to the said point on the fourth arm between the retracted and second extended positions results in rotational movement of the first and second arms about their respective fixed pivots.

Similarly, a force applied to one of the third and fourth arms, causing movement of the arm, in turn results in movement of the other of the third and fourth arms.

The distance between the first and second fixed pivots and the lengths of the first, second, third and fourth arms may be selected according to the desired movement of the components to be achieved and the particular application of the assembly.

Generally, the ratio of the length of the first arm, that is the distance between the first and second positions on the first arm, to the distance between the first and second fixed pivots may range from 0.5 to 2.0, more preferably from 0.6 to 1.75, still more preferably from 0.75 to 1.5. The first arm is preferably no longer than, more preferably shorter in length than the distance between the first and second fixed pivots. The ratio of the length of the first arm to the distance between the first and second fixed pivots is therefore more preferably from 0.75 to 0.99, still more preferably from 0.8 to 0.99, in particular from 0.9 to 0.99. A ratio of about 0.92 to about 0.98 is particularly suitable for many applications.

The length of the second arm may be considered to be the distance between the first position on the second arm and the furthest of the second and third positions from the first position. The ratio of the length of the second arm to the distance between the first and second fixed pivots may range from 0.5 to 2.0, more preferably from 0.6 to 1.75, still more preferably from 0.75 to 1.5. The second arm is preferably shorter in length than the distance between the first and second fixed pivots. The ratio of the length of the second arm to the distance between the first and second fixed pivots is therefore more preferably from 0.75 to 0.99, still more preferably from 0.8 to 0.99, in particular from 0.9 to 0.99. A ratio of about 0.92 to about 0.98 is particularly suitable for many applications.

The length of the second arm is preferably selected to be as long as possible, within the constraints of the other components of the assembly and the desired motion. In this way, the arc through which the second and third positions on the second arm move about the second fixed pivot has as large a radius as possible. This facilitates the positioning of the second connecting arm.

The second arm may be longer or shorter than the first arm. In one preferred embodiment, the first and second arms are of the same length.

Taking the length of the third arm to be the distance between the first position on the third arm and the said point on the third arm, the length of the third arm will be determined by the arrangement of the first and second arms, together with the connecting arms. In some embodiments, the length of the third arm is less than that of the first and second arms, in particular from 0.9 to 0.99 of the length of the first and/or second arms. For example, with the first and second arms being of equal length and less than the distance between the first and second fixed pivots, the third arm may have a length of about 0.975 that of the first and second arms. In alternative embodiments, the length of the third arm is the same as that of the first arm and/or the second arm.

In one particularly preferred arrangement, the first, second and third arms are the same length.

Similarly, taking the length of the fourth arm to be the distance between the first position on the fourth arm and the said point on the fourth arm, the length of the fourth arm will be determined by the arrangement of the first and second arms, together with the connecting arms. In some embodiments, the length of the fourth arm is less than that of the first and second arms, in particular from 0.9 to 0.99 of the length of the first and/or second arms. For example, with the first and second arms being of equal length and less than the distance between the first and second fixed pivots, the fourth arm may have a length of about 0.975 that of the first and second arms. In alternative embodiments, the length of the fourth arm is the same as that of the first arm and/or the second arm.

In one particularly preferred arrangement, the first, second and fourth arms are the same length.

The third and fourth arms may have the same or different lengths, with the third arm being longer or shorter than the fourth arm. In one preferred embodiment, the third and fourth arms are the same length.

The assembly comprises a fifth arm. The fifth arm is mounted to an object to be moved by the assembly. The fifth arm may have any shape and configuration. A preferred form for the fifth arm is an elongate member, for example a bar or a rod. The fifth arm is pivotably mounted to each of the third connecting arm and the fourth connecting arm, as described in more detail hereinafter. The pivotable connections between these arms may be of any suitable form, preferably a pin, spindle or axle passing through the arms about which one or both of the arms are free to move.

The assembly further comprises a first connecting arm. The first connecting arm extends between the first arm and the third arm. The first connecting arm may have any shape and configuration. A preferred form for the first connecting arm is an elongate member, for example a bar or a rod. The first connecting arm is pivotably mounted to each of the first and third arms. The pivotable connections between the first connecting arm and each of the first and third arms may be of any suitable form, preferably a pin, spindle or axle passing through the arms about which one or both of the arms are free to move.

The pivotable connections may be at any suitable location on the first connecting arm. In one preferred embodiment, the pivotable connection between the first connecting arm and the first arm is at or adjacent one end of the first connecting arm and/or the pivotable connection between the first connecting arm and the third arm is at or adjacent the second end of the first connecting arm.

The first connecting arm is connected to the first arm at a second position on the first arm. The second position on the first arm is spaced apart from the first position on the first arm. In one preferred embodiment, the second position on the first arm is at or adjacent the second end of the first arm.

The first connecting arm is further connected to the third arm at a second position on the third arm, this second position being spaced apart from the first position on the third arm.

The first connecting arm may have any suitable length. Its length is preferably the distance between the positions on the first and third arms between which the first connecting arm extends.

The second position on the third arm, at which the first connecting arm is connected, may be selected according to a number of factors. First, the first connecting arm acts to provide support for the third arm, in particular to assist in supporting any load applied to the third arm. The requirement for the third arm to be supported in this manner by the first connecting arm is a factor in determining the location of the second position on the third arm. Second, the overall strength and stability of the assembly is related to the length of the first connecting arm, with the strength and stability reducing as the length of the first connecting arm increases.

The second position on the third arm may be at any suitable position. In particular, the ratio of the distance between the first position and the second position on the third arm and the distance between the first position and the said point on the third arm may be from 0.1 to 0.9, more preferably from 0.1 to 0.8, still more preferably from 0.1 to 0.7, in particular from 0.1 to 0.6. A preferred ratio is from 0.1 to 0.55. The ratio of the distance between the first position and the second position on the third arm and the distance between the first position and the said point on the third arm is preferably less than 0.75, more preferably less than 0.65, more preferably less than 0.55. A ratio of up to 0.5 has been found to be particularly suitable. One particularly preferred embodiment of the assembly has the ratio of the distance between the first position and the second position on the third arm and the distance between the first position and the said point on the third arm about 0.15 to about 0.35, more preferably about 0.2 to about 0.3, still more preferably about 0.23 to 0.28.

The assembly further comprises a second connecting arm. The second connecting arm extends between the first arm and the second arm. The second connecting arm may have any shape and configuration. A preferred form for the second connecting arm is an elongate member, for example a bar or a rod. The second connecting arm is pivotably mounted to each of the first and second arms. The pivotable connections between the second connecting arm and each of the first and second arms may be of any suitable form, preferably a pin, spindle or axle passing through the arms about which one or both of the arms are free to move.

The pivotable connections may be at any suitable location on the second connecting arm. In one preferred embodiment, the pivotable connection between the second connecting arm and the first arm is at or adjacent one end of the first connecting arm and/or the pivotable connection between the second connecting arm and the second arm is at or adjacent the second end of the second connecting arm.

The second connecting arm is connected to the first arm at a third position on the first arm, this third position being spaced apart from and between both the first and second positions on the first arm.

The third position on the first arm, at which the second connecting arm is connected, may be selected according to a number of factors. First, the second connecting arm acts to provide support for the first arm, in particular to assist in supporting any load applied to the first arm. The requirement for the first arm to be supported in this manner by the first connecting arm is a factor in determining the location of the third position on the first arm. Second, as with the first connecting arm, the overall strength and stability of the assembly is related to the length of the second connecting arm, with the strength and stability reducing as the length of the second connecting arm increases.

The third position on the first arm may be at any suitable position. In particular, the ratio of the distance between the first position and the third position on the first arm and the distance between the first position and the second position on the first arm may be from 0.1 to 0.9, more preferably from 0.2 to 0.8, still more preferably from 0.3 to 0.7, in particular from 0.4 to 0.6. A preferred ratio is from 0.4 to 0.55. The ratio of the distance between the first position and the third position on the first arm and the distance between the first position and the second position on the first arm is preferably less than 0.75, more preferably less than 0.65, more preferably less than 0.55. A ratio of up to 0.5 has been found to be particularly suitable. One particularly preferred embodiment of the assembly has the ratio of the distance between the first position and the third position on the first arm and the distance between the first position and the second position on the first arm about 0.4 to 0.5.

The second connecting arm is further connected to the second arm at a fourth position on the second arm. In one embodiment of the assembly, the fourth position is spaced apart from the first, second and third positions on the second arm. In one alternative embodiment, the fourth position on the second arm coincides with the second position on the second arm, such that the second connecting arm is connected to both the second and third arms. This arrangement has the advantage of being particularly compact. In a second alternative embodiment, the fourth position on the second arm coincides with the third position on the second arm, such that the second connecting arm is connected to both the second and fourth arms. This arrangement also has the advantage of being particularly compact. In a third alternative embodiment, the fourth position on the second arm coincides with both the second and third positions on the second arm, such that the second connecting arm is connected to the second, third and fourth arms. This is also a particularly compact arrangement.

The fourth position on the second arm is at or spaced from the second position on the second arm and may be at any suitable position. In particular, the ratio of the distance between the first position and the fourth position on the second arm and the distance between the first position and the second position on the second arm may be from 0.8 to 1.0, more preferably from 0.85 to 1.0, still more preferably from 0.875 to 1.0, in particular from 0.9 to 1.0. A preferred ratio is from 0.925 to 1.0. One particularly preferred embodiment of the assembly has the ratio of the distance between the first position and the fourth position on the second arm and the distance between the first position and the second position on the second arm about 0.95 to 1.0.

Similarly, the third position on the second arm is at or spaced from the third position on the second arm and may be at any suitable position. In particular, the ratio of the distance between the first position and the fourth position on the second arm and the distance between the first position and the third position on the second arm may be from 0.8 to 1.0, more preferably from 0.85 to 1.0, still more preferably from 0.875 to 1.0, in particular from 0.9 to 1.0. A preferred ratio is from 0.925 to 1.0. One particularly preferred embodiment of the assembly has the ratio of the distance between the first position and the fourth position on the second arm and the distance between the first position and the third position on the second arm about 0.95 to 1.0.

The second connecting arm may have any suitable length. Its length is preferably the distance between the first position and the farthest of the second, third and fourth position.

The assembly further comprises a third connecting arm. The third connecting arm extends between the first arm and the fourth arm and also between the fourth arm and the fifth arm. The third connecting arm may have any shape and configuration. A preferred form for the third connecting arm is an elongate member, for example a bar or a rod. The third connecting arm is pivotably mounted to each of the first, fourth and fifth arms. The pivotable connections between the first connecting arm and each of the first, fourth and fifth arms may be of any suitable form, preferably a pin, spindle or axle passing through the arms about which one or both of the arms are free to move.

The pivotable connections may be at any suitable location on the third connecting arm. In one preferred embodiment, the pivotable connection between the third connecting arm and the first arm is at or adjacent one end of the third connecting arm and/or the pivotable connection between the third connecting arm and the fifth arm is at or adjacent the second end of the third connecting arm. The pivotable connection between the third connecting arm and the fourth connecting arm is between the connections between the third connecting arm and the first and fifth arms.

The third connecting arm is connected to the first arm at a fourth position on the first arm. The fourth position on the first arm is spaced apart from the first position on the first arm. In one embodiment, the fourth position on the first arm is at or adjacent the second end of the first arm. In one preferred embodiment, the fourth position on the first arm is coincident with the second position on the first arm, that is the first and third connecting arms are pivotally connected to the first arm at the same location, most preferably at or adjacent the second end of the first arm.

The third connecting arm is further connected to the fourth arm at a second position on the fourth arm, this second position being spaced apart from the first position on the fourth arm.

The third connecting arm is still further connected to the fifth arm at a first position on the fifth arm. The first position on the fifth arm may be at a first end of the fifth arm.

The third connecting arm may have any suitable length. Its length is preferably the distance between the positions on the first and fifth arms between which the second connecting arm extends.

The second position on the fourth arm, at which the third connecting arm is connected, may be selected according to a number of factors. First, the third connecting arm acts to provide support for the fourth arm, in particular to assist in supporting any load applied to the fourth arm. The requirement for the fourth arm to be supported in this manner by the third connecting arm is a factor in determining the location of the second position on the fourth arm. Second, the overall strength and stability of the assembly is related to the length of the third connecting arm, with the strength and stability reducing as the length of the third connecting arm increases.

The second position on the fourth arm may be at any suitable position. In particular, the ratio of the distance between the first position and the second position on the fourth arm and the distance between the first position and the said point on the fourth arm may be from 0.1 to 0.9, more preferably from 0.2 to 0.8, still more preferably from 0.3 to 0.7, in particular from 0.35 to 0.6. A preferred ratio is from 0.4 to 0.55. The ratio of the distance between the first position and the second position on the fourth arm and the distance between the first position and the said point on the fourth arm is preferably less than 0.75, more preferably less than 0.65, more preferably less than 0.55. A ratio of up to 0.5 has been found to be particularly suitable. One particularly preferred embodiment of the assembly has the ratio of the distance between the first position and the second position on the fourth arm and the distance between the first position and the said point on the fourth arm about 0.41 to about 0.47.

As noted, the third connecting arm is connected to the fourth arm at a position on the third connecting arm between its connections with the first and fifth arms. Preferably, the ratio of the distance on the third connecting arm between its connection with the fourth and fifth arms to the distance on the third connecting arm between its connection with the first and fourth arms is from 0.1 to 0.5, more preferably from 0.2 to 0.4, with a ratio about 0.33 being particularly preferred for many embodiments.

The second position on the fourth arm may be at the same relative location as the second position on the third arm. Preferably, the second position on the third arm is at a different relative position to the second position on the fourth arm. In this way, the third and fourth arms are at different positions at all points in movement from the retracted position.

The arrangement of the assembly is most preferably such that the third and fourth arms are at different positions, once the assembly is moved from the retracted position. In particular, the fourth arm is arranged to lead the third arm as the assembly is moved from the retracted position. This may be achieved by appropriate selection of the length of the first and third connecting arms and/or the position of the second position on each of the third and fourth arms.

For example, the ratio of the distance between the first and second positions on the third arm to the distance between the first and second positions on the fourth arm may be from 1.0 to 3.0, more preferably from 1.3 to 2.0, still more preferably from 1.5 to 2.0. A ratio of from 1.6 to 1.85 has been found to be particularly advantageous. The ratio of the length of the third connecting arm to the length of the first connecting arm may be from 1.0 to 2.0, preferably from 1.2 to 1.8, more preferably from 1.3 to 1.7. A ratio of from 1.5 to 1.6 has been found to be particularly advantageous. Embodiments of the assembly with such ratios may be arranged such that the said point on the third arm is at the second extended position, that is at the end of its path of linear motion, when the fourth arm is substantially perpendicular to the line extending between the first and second fixed pivots.

In general, the arms and connecting arms move parallel to one another. In other words, the arms and connecting arms may each be considered to move in approximately a single plane that is coincident with or parallel to the plane of one or more of the other arms and connecting arms. In use, a number of the arms and connecting arms cross one another. It is advantageous if the arms or connecting arms that cross in this manner are slidably connected to one another. In particular, a first arm or connecting arm that crosses a second arm or connecting arm may be slidably connected to the second arm or connecting arm. For example, a first arm or connecting arm is provided with a member that slides therealong, the member being connected, preferably pivotally connected, to a second arm or connecting arm that crosses the first in use. In this way, the rigidity of the two arms so interconnected is increased, in particular increasing the lateral stability of the arms and preventing their movement out of the normal plane of movement.

In one embodiment, to provide increased rigidity and strength to the assembly, the first arm is slidably connected to the second arm. More particularly, one of the first and second arms is preferably provided with a member that slides therealong. The member is pivotally connected to the other of the first and second arms. In one preferred arrangement, the sliding member is mounted on the second arm.

The assembly further comprises a fourth connecting arm. The fourth connecting arm may have any shape and configuration. A preferred form for the fourth connecting arm is an elongate member, for example a bar or a rod. The fourth connecting arm extends between the fourth arm and the fifth arm. The fourth connecting arm is pivotably mounted to each of the fourth arm and the fifth arm. The pivotable connections between the fourth connecting arm and each of the fourth and fifth arms may be of any suitable form, preferably a pin, spindle or axle passing through the arms or object about which one or both of the arms and the object are free to move.

The pivotable connections may be at any suitable location on the fourth connecting arm. In one preferred embodiment, the pivotable connection between the fifth arm and the fourth arm is at or adjacent one end of the fourth connecting arm and/or the pivotable connection between the fourth connecting arm and the fifth arm is at or adjacent the second end of the fourth connecting arm.

The fourth connecting arm may be any suitable length. In particular, the fourth connecting arm may be the length required to position the fifth arm, and hence the object mounted thereto, relative to the fourth arm in the extended position, that is to move the object to and hold the object in the desired position and orientation in the extended position.

The fourth connecting arm is pivotably connected to the fourth arm at a second position on the fourth arm. The second position on the fourth arm may be any suitable position to provide support to and orient the object. In one preferred embodiment, the second position on the fourth arm is at the second end of the fourth arm. The second position on the fourth arm may be coincident with the said point on the fourth arm.

The fourth connecting arm is further connected to the fifth arm at a second position on the fifth arm. The second position on the fifth arm may be at a second end of the fifth arm or displaced therefrom, depending, for example, upon the object to be moved.

The assembly may comprise further arms and respective connecting arms, arranged as described above in respect of the third arm and first connecting arm. Thus, the assembly may comprise one or more additional arms analogous to the third arm, each additional arm with an appropriate connecting arm, each arranged in an analogous manner to that of the third arm and first connecting arm, as described hereinbefore. The second position on the or each additional arm is preferably at a different relative location on the arm to the second position of the third arm and/or the length of the or each additional connecting arm is different to that of the first connecting arm. This ensures that each additional arm is at a different position and orientation to the third arm, as described hereinbefore.

Relative movement of the components of the assembly may be limited or restricted, for example to limit the movement of the third arm such that the motion of the said point is confined to a straight line between the retracted and extended positions. Suitable means for limiting the relative movement of components of the assembly include a flexible tie or tether extending between two of the arms or connecting arms. In one embodiment, a flexible tie or tether extends between the first arm and the third arm or the fourth arm, in particular between a point on the first arm between the first and fourth positions thereon and the first position on the third arm or the fourth arm. One preferred form for the flexible tie comprises a plurality of hingedly connected components moveable between a folded condition when the assembly is in the retracted position and a fully extended condition in an extended position. In this way, the third arm may deploy from the retracted position a plurality of hingedly connected components.

In a particularly preferred embodiment of the assembly of the present invention, the lengths of the arms and the connecting arms are selected in accordance with the above criteria and to fold up when in the retracted position to lie between the first and second fixed pivots. It is a particular advantage that the assembly can be arranged to be in such a compact form when in the retracted position. In a preferred embodiment, the arms and the connecting arms are formed with portions having 'I', 'L' and/or 'U' shapes in cross-section, with the portions being arranged to allow the arms to be accommodated within one another when in the retracted position.

As noted above, one or more forces to move the assembly and objects attached thereto may be applied to one or more of the arms of the assembly. It has been found that in some embodiments, it is advantageous to include a further arm into the assembly. In particular, as noted above, the third arm may be used to deploy an object, such as a floor assembly (as described hereinafter) along a substantially straight line path, in particular substantially perpendicular to the line joining the first and second fixed pivots. To improve the movement of the assembly both when extending and when retracting, a driving arm may be provided, to provide drive directly or indirectly to the third arm. The driving arm is pivotally mounted at one end either to the third arm or to an object or other member connected to the third arm. A second end of the driving arm is slidably connected to the fixed structure, in particular at a position between the first and second fixed pivots. More preferably, the second end of the driving arm is slidable along the line extending between the first and second fixed pivots. In this way, a driving force may be applied to the second end of the driving arm, so as to move the driving arm along the said line between the first and second fixed pivots. This in turn drives the assembly between the extended and retracted positions.

It is a further advantage of the assembly of the present invention that it is highly scaleable and may be constructed and applied at a wide range of scales to convert motion, as described hereinbefore.

The assembly finds wide applications and uses, in particular by allowing relative movement between a first component, a second component and a third component.

Accordingly, in a further aspect, the present invention provides an assembly comprising a first component, a second component and a third component, the second and third components being arranged for movement with respect to the first component, wherein an assembly as hereinbefore described is provided between the first component and the second and third components, operation of the assembly providing movement of the second and third components with respect to the first component.

One of the second and third components is connected to the third arm of the assembly, the other of the second and third components being connected to the fourth arm. The first component provides the first and second fixed pivot points to which the first and second arms are pivotally connected. In this way, movement of the second and third components with respect to the first component is effected. As noted above, such relative movement may be effected by applying a force to the first arm, the second arm or to the third or fourth arms of the assembly.

Provision for further components to be moved in like manner may be made by the inclusion of further arms and connecting arms in the assembly, as hereinbefore described.

The assembly comprising the first, second and third components finds extensive use in providing relative movement between a plurality of components. For example, the assembly finds use in moving a first component connected to either of the first or second arms and rotating about the respective first or second fixed pivot, a second component connected to the said point on the third arm and moveable in a linear motion between the retracted and first extended positions, and a third component connected to the said point on the fourth arm and moveable in a linear motion between the retracted and second extended positions. Further, the assembly finds use in displacing and rotating a component connected to one of the third or fourth arms relative to the first or second fixed pivots or the line extending therebetween.

In many applications, a plurality of assemblies is employed. In particular, a plurality of assemblies may be employed in a spaced apart relationship on opposing sides of objects to be moved. For example, a first and second assembly may be provided on opposing sides of an object to be moved with the third or fourth arms of the two assemblies connected to opposing sides of the object.

Applications of the assembly of the present invention to convert rotational motion to linear motion include the support and movement of building structures relative to one another.

Accordingly, the present invention further provides a building comprising:

a first building portion, a second building portion and a third building portion, the second building portion being moveable relative to the first building portion between a retracted position and a first extended position and the third building portion being moveable relative to the first building portion between a retracted position and a second extended position;

wherein relative movement between the first, second and third building portions and support of the second and third building portions with respect to the first building portions are provided by an assembly as hereinbefore described.

The first building portion may be any structure or part of a building, in particular a fixed structure, such as a house, apartment or office building, or a mobile building structure, such as a mobile house, caravan or the like. The second and third building portions may be any structures or components of the installation that are required to be moved in a coordinated manner relative to the first building portion between the retracted and extended positions. Examples of such structures include balconies, floor extensions, roof extensions, canopies and the like.

The assembly of the present invention is particularly advantageous for the movement of components of a building assembly, as the assembly and components may be may be extended from a retracted position from one side of the building. As noted above, the arms of the assembly move from the retracted position, in which the arms lie between or to one side of the line joining the first and second fixed pivots, to the extended position, with movement of all the arms and the components being to one side only of the line joining the first and second fixed pivots. In this way, the assembly and the components to be moved may be arranged to occupy little or no space within the building in the retracted condition.

In a further aspect, the present invention provides a building assembly comprising:
  a first building component;
  a roof assembly; and
  a floor assembly;
  wherein the roof assembly and the floor assembly both being moveable relative to the first building component;
  the building assembly further comprising an assembly as hereinbefore described, the first and second fixed pivots being located on the first building component;
  wherein the floor assembly is connected to the third arm, such that the third arm extends the floor assembly from a retracted position to an extended position in which the floor assembly provides a substantially horizontal floor; and
  wherein the roof assembly is connected to the fifth arm, such that the fifth arm extends the roof assembly from a retracted position to an extended position, in which a component of the roof assembly is both rotated and displaced relative to the first building component.

The assembly is used to deploy a floor assembly from the first building component, preferably to provide a floor extending outwards from the first building component. In a preferred embodiment, the floor assembly comprises a plurality of hinged floor components, the floor components being folded in the retracted position. The action of the assembly is to unfold the floor components to provide a substantially horizontal floor extending outwards from the first building component.

A particular problem may arise when moving a floor assembly having a plurality of hinged floor components from the extended position, in particular if the floor assembly is arranged to have the floor components lying in a single plane, for example horizontally. The floor assembly may lock in the extended position. To retract the floor assembly in such a situation, one or more of the hinged floor components may be lifted out of the aforesaid plane. The provision of a driving arm as hereinbefore described overcomes this problem. In a preferred arrangement, the driving arm is pivotally connected at its first end to a hinged floor component, in particular the hinged component closest to or adjacent the fixed structure bearing the fixed pivots.

The same assembly is also used to deploy a roof assembly. Preferably, a roof portion of the roof assembly is connected to the fifth arm and is deployed by the assembly. In the extended position, the roof portion is both rotated and displaced from its retracted position. The roof portion may be deployed at any angle. In one embodiment, the roof portion is disposed substantially horizontally in the extended position. In one preferred embodiment, an intermediate roof portion is deployed by the action of the assembly, the intermediate roof portion extending between the building component and the roof portion in the extended position.

In one preferred embodiment, the weight of the floor assembly is employed to move the building assembly from the retracted position to the extended position, in particular to move and raise the roof assembly.

Figure 2B:
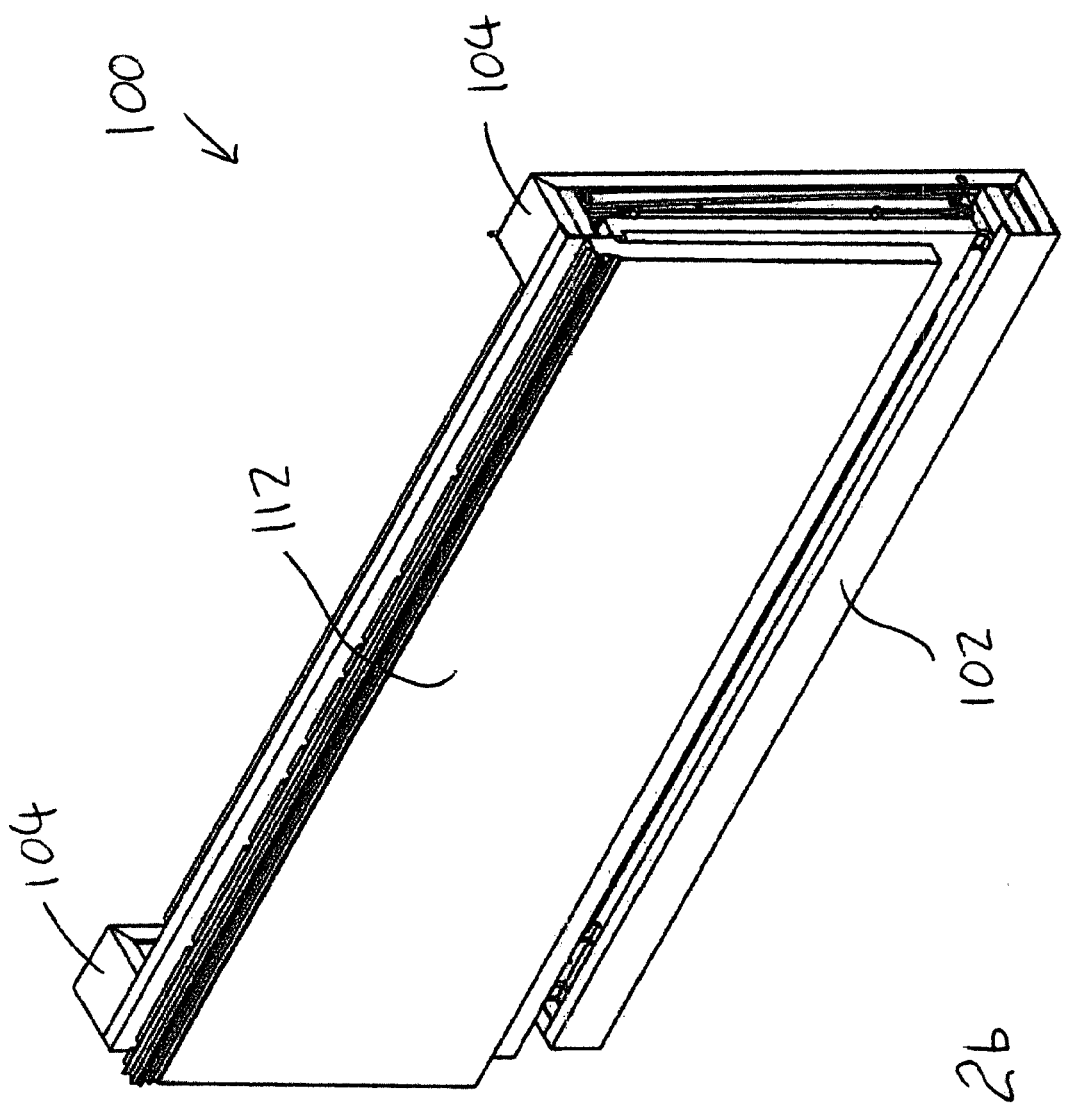
Figure 3A:
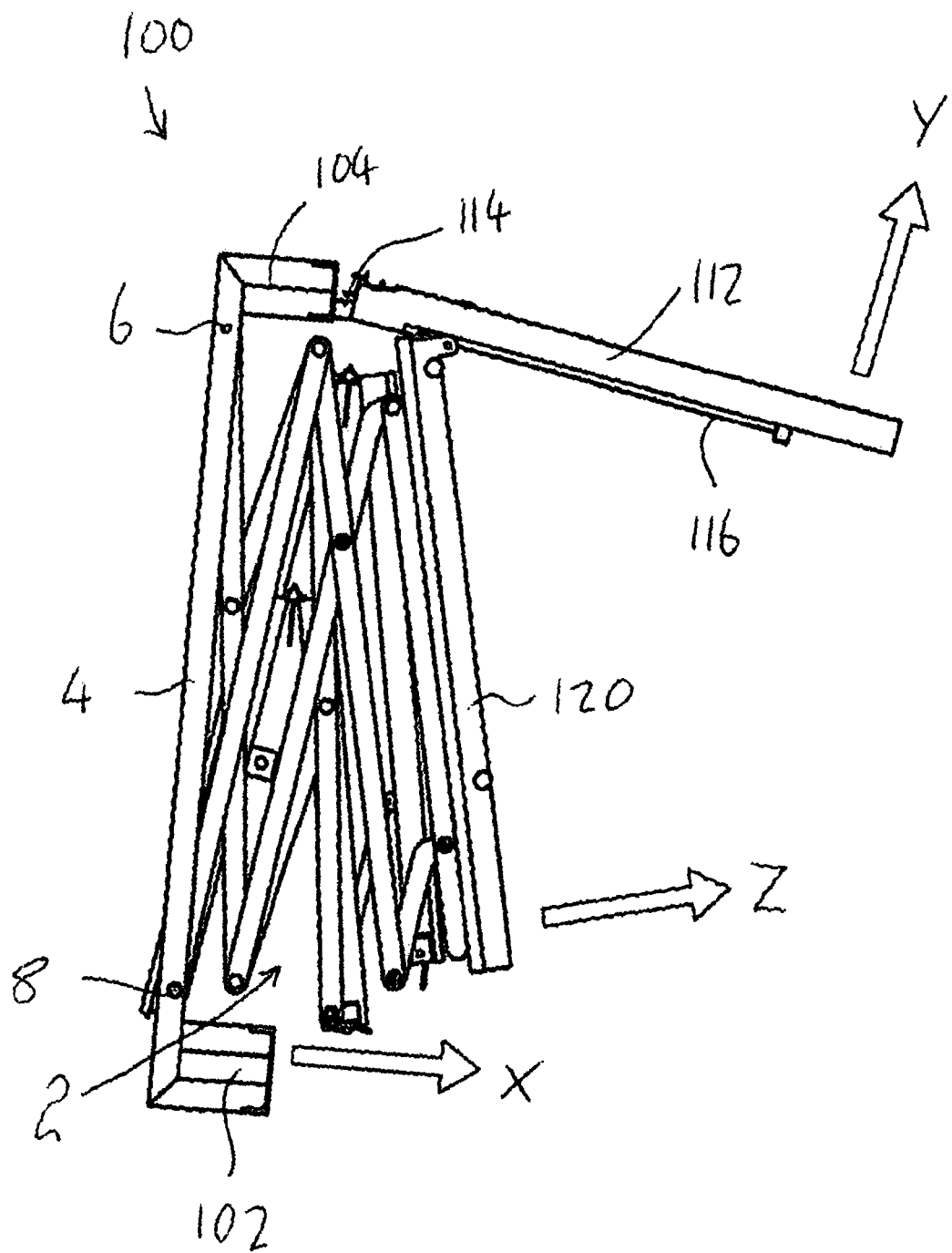
Figure 3B:
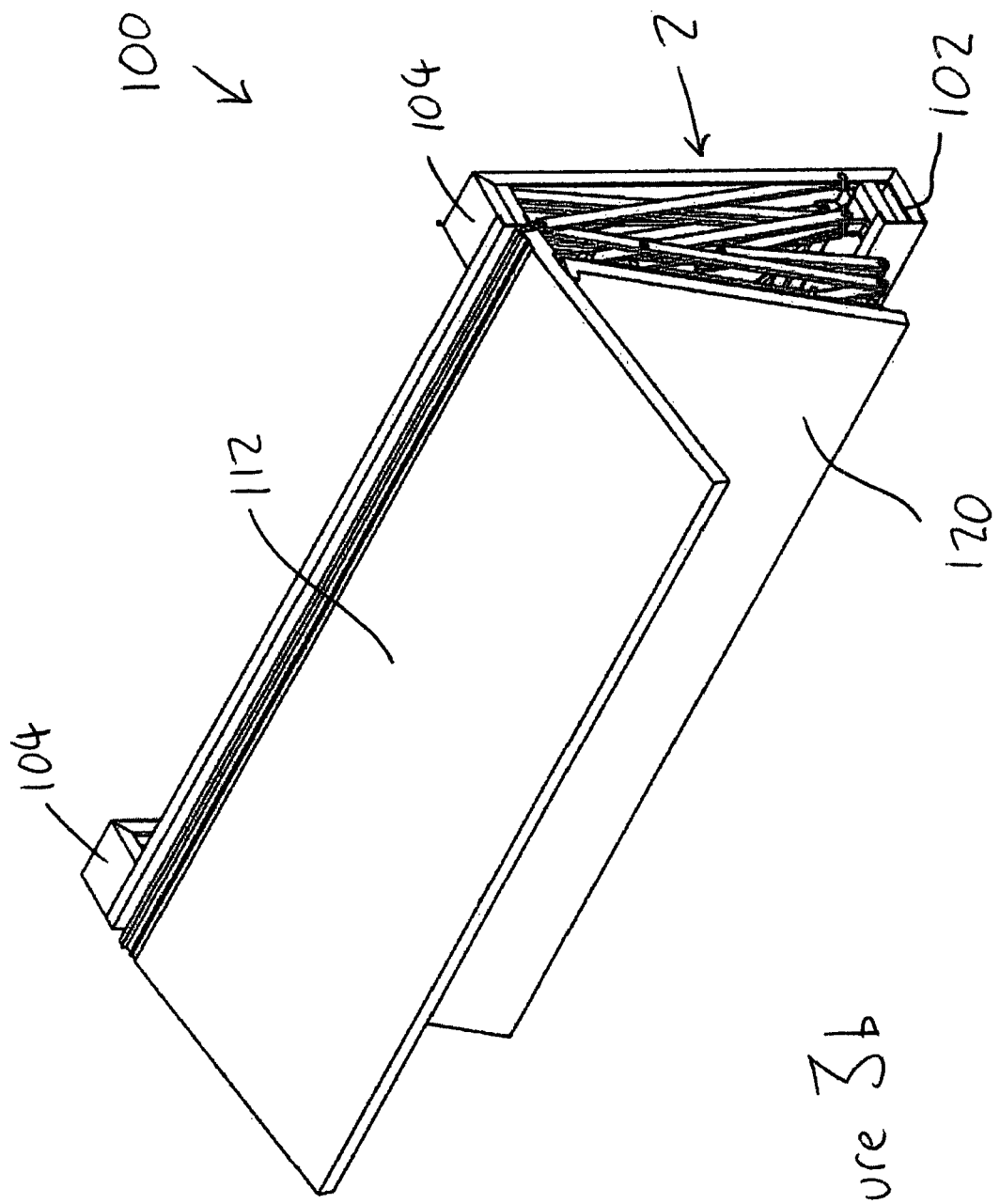
Figure 4B:
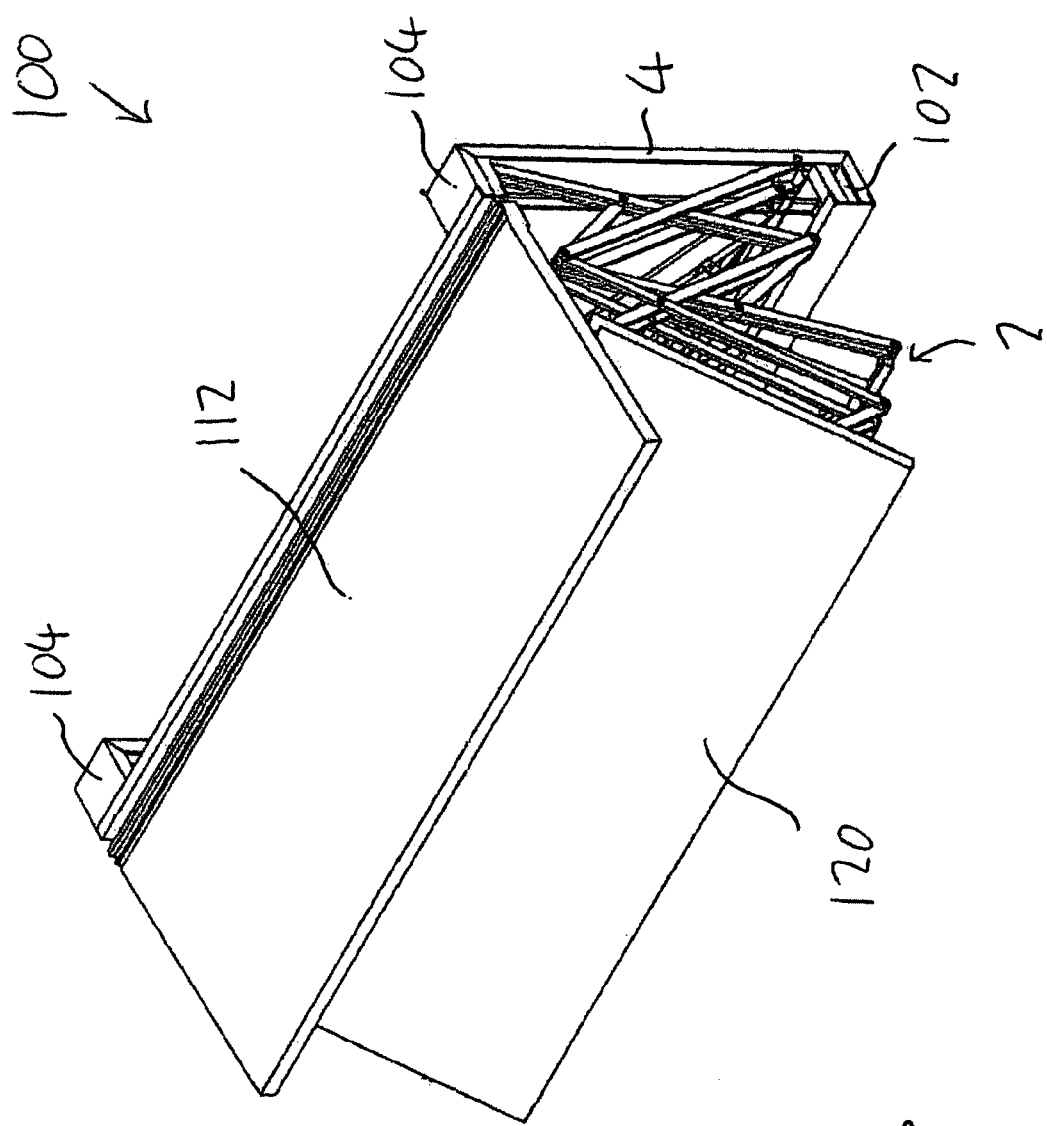
Figure 5B:
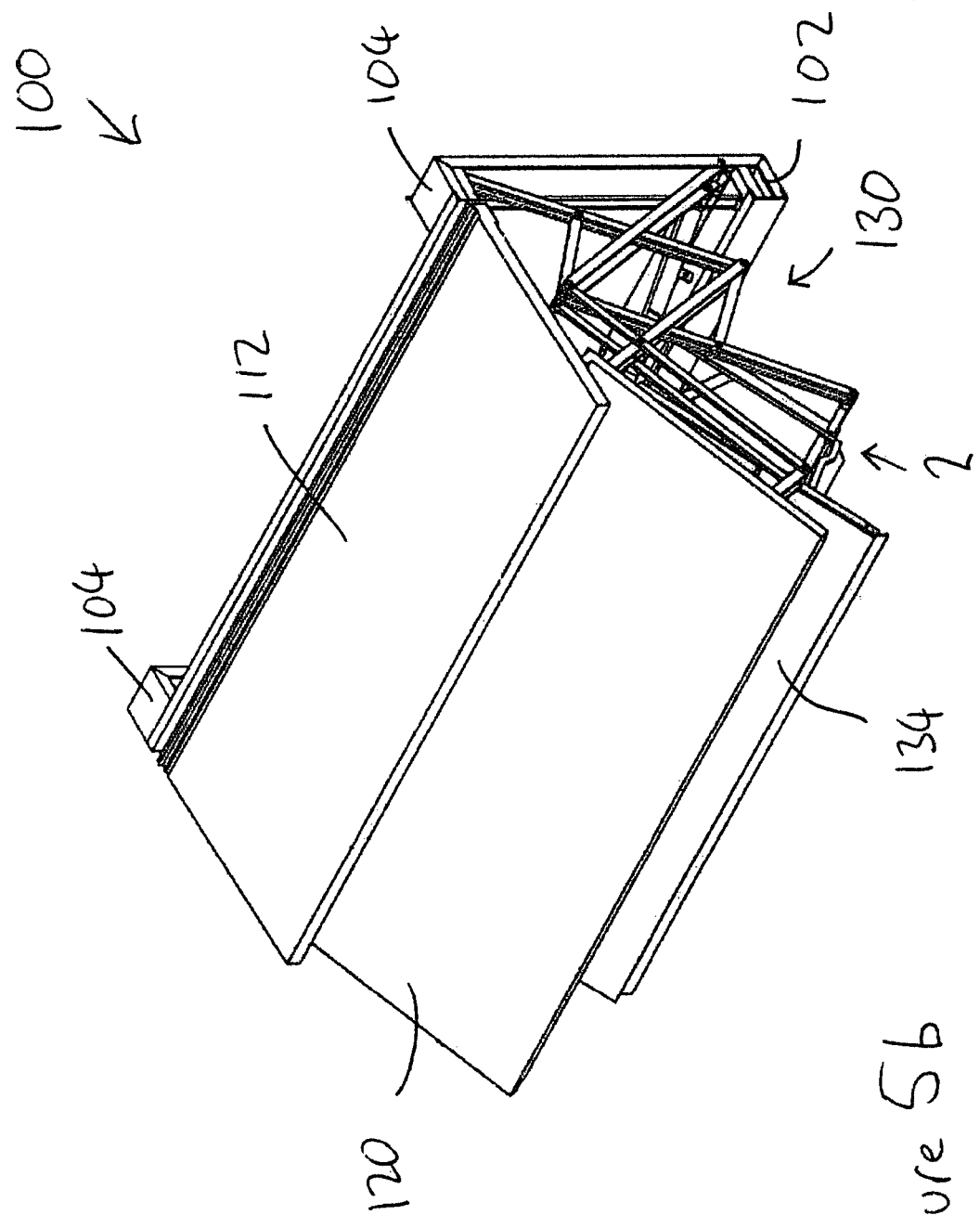
Figure 6A:
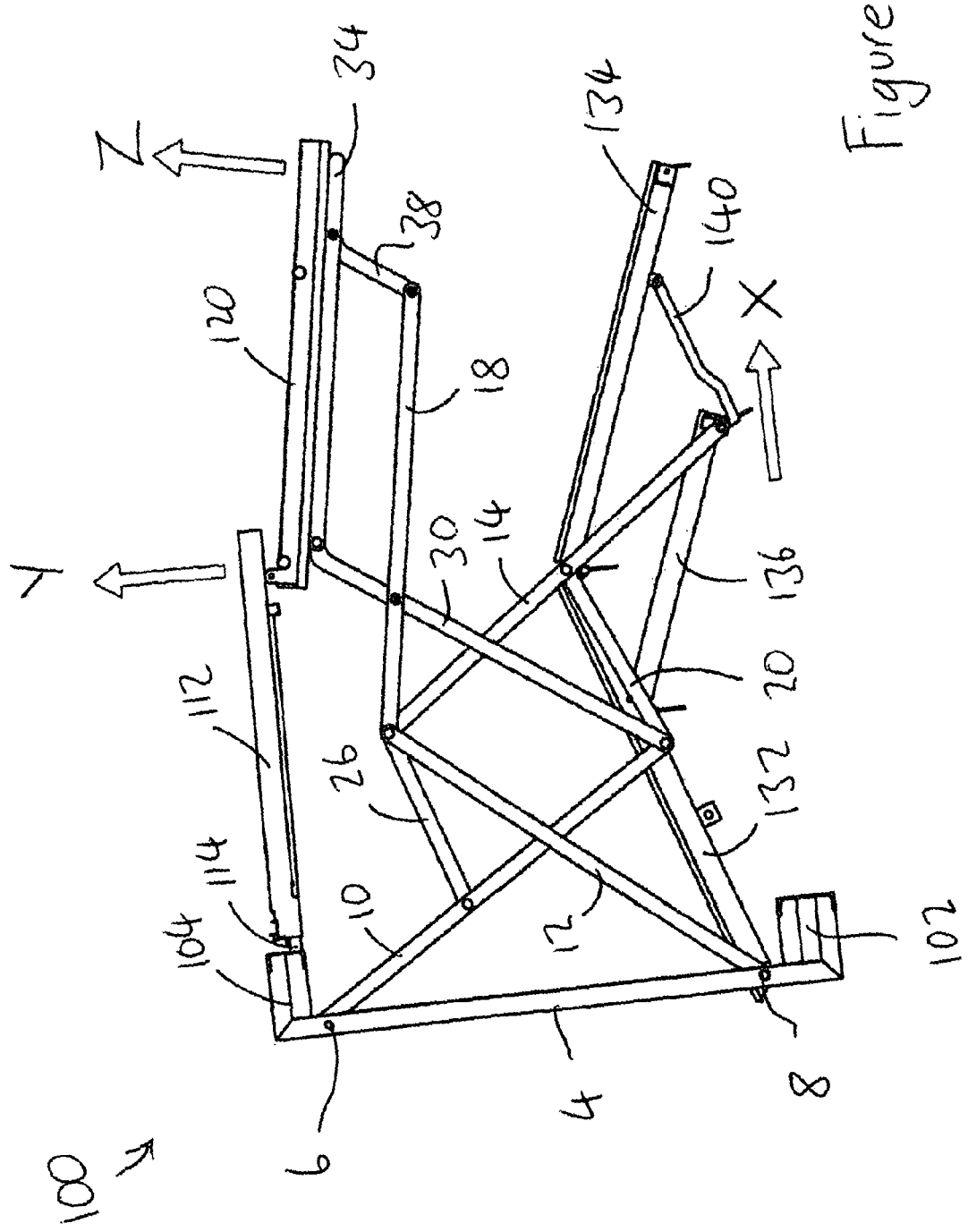
Figure 6B:
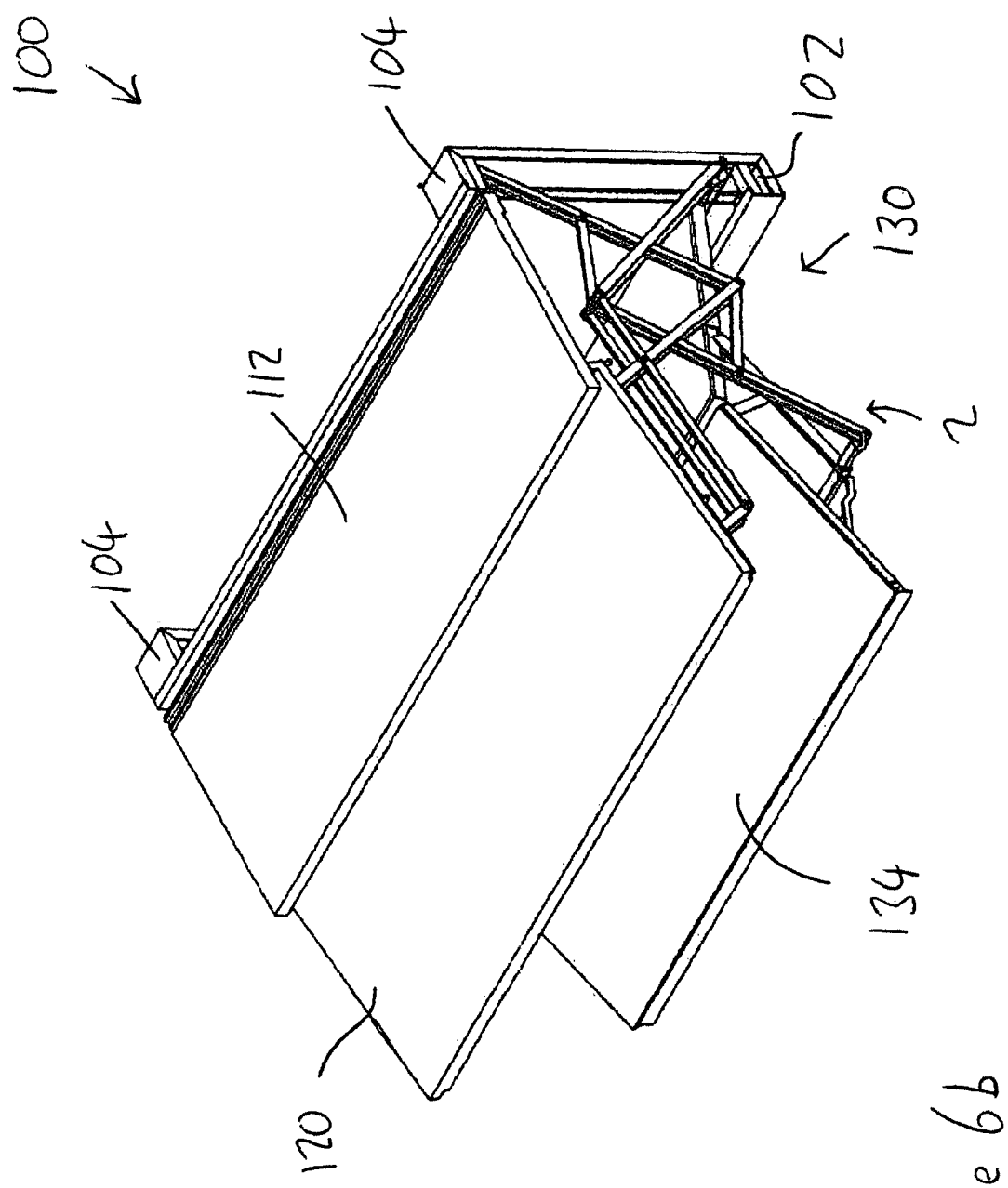
Figure 7A:
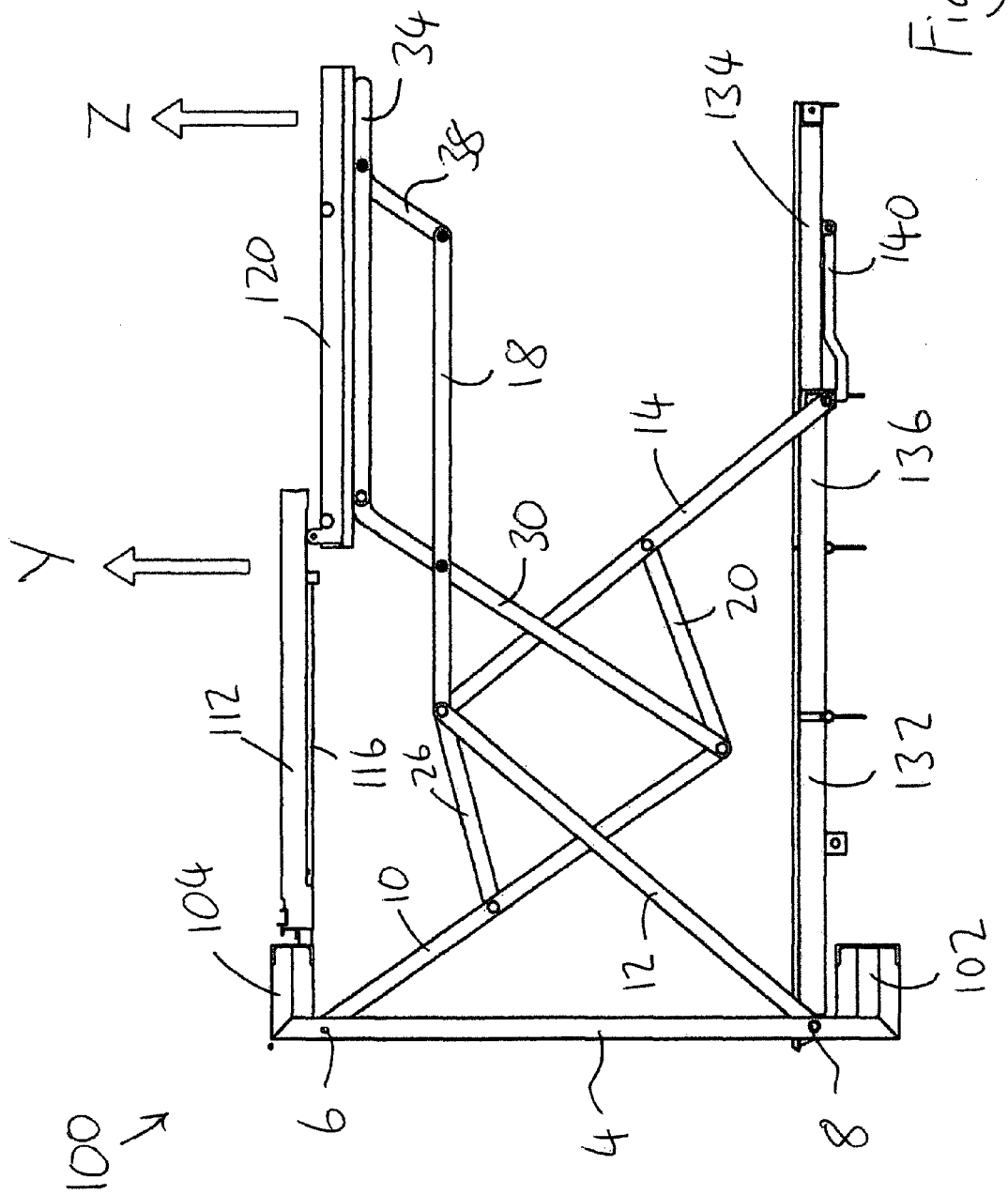
Figure 7B:
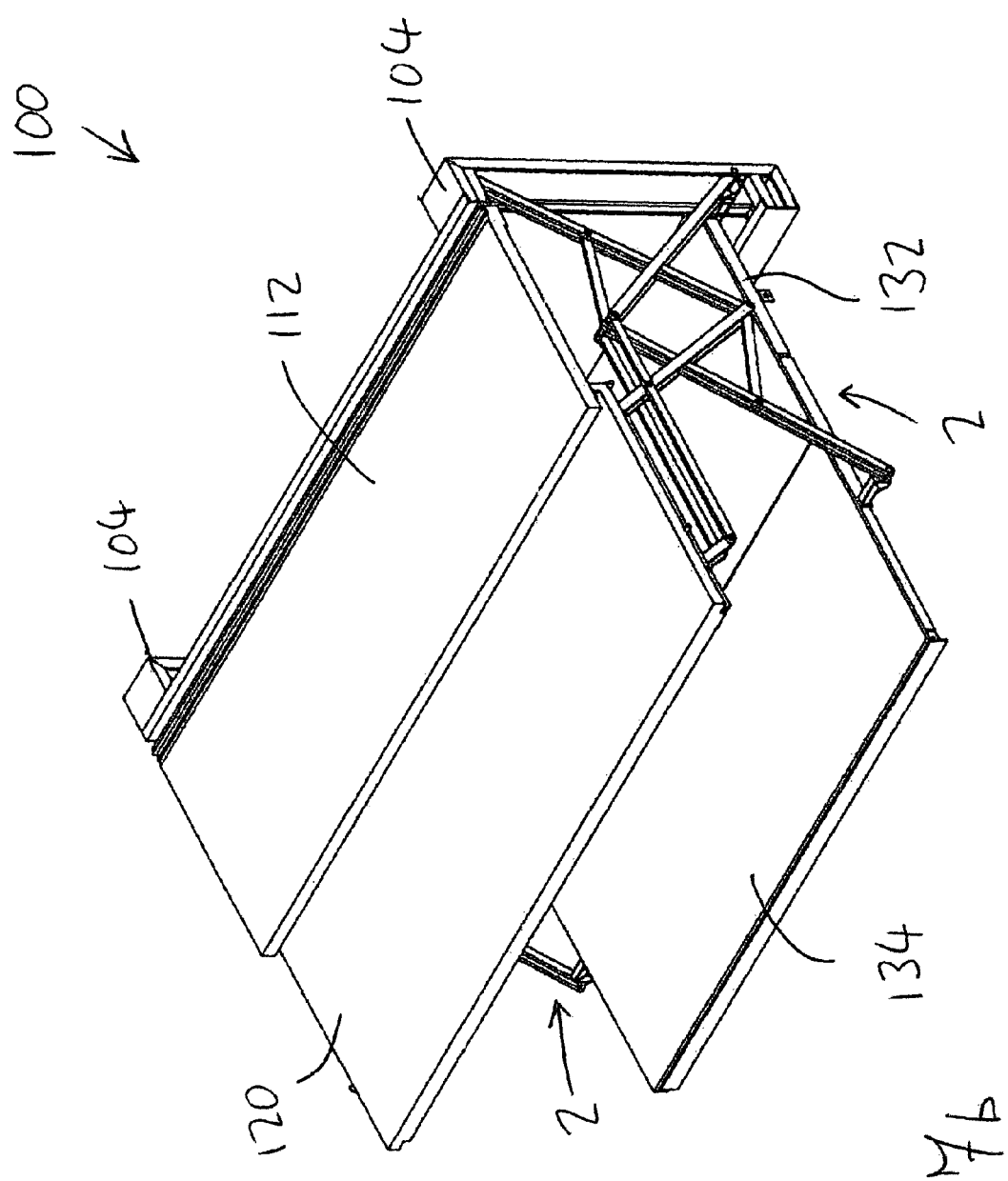

The principles and operation of the assembly of the present invention will be further explained, by way of example only, having reference to the accompanying figures, in which:

FIG. 1 is a simplified diagrammatical representation of an assembly according to the present invention in a partially extended position;

FIG. 2*a* is a side view of the assembly of the assembly of FIG. 1 in a retracted position;

FIG. 2*b* is a perspective view of the assembly of FIG. 2*a*;

FIG. 3*a* is a side view of the assembly of FIG. 1 in a first partially extended position;

FIG. 3*b* is a perspective view of the assembly of FIG. 3*a*;

FIG. 4*a* is a side view of the assembly of FIG. 1 in a second partially extended position;

FIG. 4*b* is a perspective view of the assembly of FIG. 4*a*;

FIG. 5*a* is a side view of the assembly of FIG. 1 in a third partially extended position;

FIG. 5*b* is a perspective view of the assembly of FIG. 5*a*;

FIG. 6*a* is a side view of the assembly of FIG. 1 in a further partially extended position;

FIG. 6*b* is a perspective view of the assembly of FIG. 6*a*;

FIG. 7*a* is a side of the assembly of FIG. 1 in an extended position;

FIG. 7*b* is a perspective view of the assembly of FIG. 7*a*; and

FIG. 8 is a simplified diagrammatical representation of an assembly according to a further embodiment of the present invention in a partially extended position.

Turning to FIG. 1, there is shown a diagrammatical representation of an assembly of one embodiment of the present invention, generally indicated as 2. The assembly 2 is shown mounted to a fixed structure, generally indicated as 4, at a first fixed pivot 6 and a second fixed pivot 8. The fixed pivots 6, 8 are spaced apart and are fixed in relation to one another. The fixed pivots 6, 8 are shown as being arranged such that the line joining them is vertical.

A first arm 10 is pivotally connected at a first position D at one end to the first fixed pivot 6. A second arm 12 is pivotally connected at a first position C at one end to the second fixed pivot 8. A third arm 14 is mounted at one end by a pivot connection 16 at the second end of the second arm 12. A fourth arm 18 is also mounted at one end by the pivot connection 16 on the second end of the second arm 12. The position of this connection between the second, third and fourth arms is indicated as B in FIG. 1.

A first connecting arm 20 is mounted at one end by a pivot connection 22 at the second end of the first arm 10, the position of this connection being indicated as E in FIG. 1. The second end of the first connecting arm is mounted by a pivot connection 24 to the third arm at a position F spaced from the position B.

A second connecting arm 26 is mounted at one end by a pivot connection 28 to the first arm at a position G spaced from both positions D and E. The second end of the second connecting arm 26 is mounted to the pivot connection 16 and thus to the second, third and fourth arms at the position B.

A third connecting arm 30 is mounted at one end by a pivot connection 22 to the first arm at the position E. The third connecting arm 30 is further mounted by a pivot connection 32 to the fourth arm at a position H, spaced from the position B. The second end of the third connecting arm 30 is mounted to a fifth arm 34 by a pivot connection 36 at a position I.

A fourth connecting arm 38 is connected at a first end to the second end of the fourth arm 18 by a pivot connection 40 at a position J. The second end of the fourth connecting arm 38 is mounted to the fifth arm 34 by a pivot connection 42 at a position K.

The pivot connections may be formed by any suitable means, for example by pins extending through holes in the arms being pivotally joined.

Movement of the first arm 10 about the first fixed pivot 6 and the second arm 12 about the second fixed pivot 8 causes the third arm 14 to move such that a point A on the end of the third arm 14 moves from a retracted position and an extended position as indicated by the arrow X. In moving between the retracted and extended positions, the point A describes a first path that is a substantially straight line.

The aforementioned movement of the first and second arms 10, 12 also causes the fourth arm 18 to move such that the position J on the fourth arm moves between the retracted position and an extended position. In moving between the retracted and extended positions, the point J on the fourth arm 18 first traces a substantially straight line path, also indicated by the arrow X. Thereafter, the position J on the fourth arm 18 moves in an arc upwards in the direction of the arrow Z. In this way, the fifth arm 34 is both rotated and displaced relative to the line joining the first and second pivot points 6, 8.

A first exemplary arrangement of the assembly of FIG. 1 has the dimensions set out in Table 1.

TABLE 1

| Dimension of assembly of FIG. 1 | Length (mm) |
|---|---|
| C-D | 3250 |
| D-E | 3000 |
| C-B | 3000 |
| B-A | 3000 |
| D-G | 1333 |
| B-F | 1500 |
| E-F | 1333 |
| E-H | 2100 |
| B-J | 3000 |
| G-B | 1233 |
| B-H | 833 |
| H-I | 2667 |
| J-K | 667 |

The arrangement of Table 1 provides movement of point A on the third arm to follow an approximate straight line perpendicular to the line joining the fixed pivots 6, 8 at positions C and D. The same movement of the assembly results in the point J on the fourth arm first following a straight line path similar to that of the path of point A, and thereafter moving through an arc. The result is the rotation and displacement of the fourth arm relative to the line joining the fixed pivots. This in turn results in movement of the fifth arm.

The assembly 2 shown in FIG. 1 mounted to a fixed structure 4, as noted above. In the arrangement shown in FIG. 1, the fixed structure 4 is part of a building assembly, generally indicated as 100. The fixed structure 4 is an exterior component of the building assembly 100, extending between a fixed base assembly 102 and a fixed roof assembly 104. The building assembly further comprises a moveable roof assembly, generally indicated as 110. The moveable roof assembly 110 is connected to the assembly 2 and is moved between a retracted position and an extended position, as will be described hereinafter.

The moveable roof assembly 110 comprises a first roof member 112. The roof member 112 is a generally planar member and is hingedly attached along one edge to the fixed roof assembly 104 by a hinge assembly 114. The first roof member 112 is provided on its lower surface, as viewed in FIG. 1, with a guide track 116. Movement of the first roof member 112 is indicated by the arrow Y.

The moveable roof assembly 110 further comprises a second roof member 120. The second roof member 120 is a generally planar member and is mounted at its lower surface, as viewed in FIG. 1, to the fifth arm 34 of the assembly 2. In this way, the second roof member 120 is moved together with the fifth arm and follows generally the same pattern of movement as the fifth arm, described above. The second roof member 120 is provided with an upwards facing roller 122, the roller bearing upon and moving along the track 116 on the lower surface of the first roof member 112. Movement of the second roof member 120 is indicated by the arrow Z.

The building assembly 100 further comprises a floor assembly, generally indicated as 130. The floor assembly comprises a generally planar, first floor member 132 hingedly attached to the fixed structure 4 at the second fixed pivot 8, as shown in FIG. 1. A second, generally planar floor member 134 is hingedly attached to the opposing free edge of the first floor member 132.

An arm 136 is pivotably connected at one end thereof to the first floor member 132 to a pivot mount 138 located on a side edge of the first floor member. The arm 136 is pivotably mounted at its second end to the point A on the third arm 14. A connecting arm 140 is pivotably mounted at one end to the point A on the third arm 14 and at its second end to a pivot mount 142 located on a side edge of the second floor member 134.

In operation, the floor assembly 130 is moved between a retracted position and an extended position by movement of the third arm 14, transferred to the floor members 132, 134 by the arms 136, 140.

The building assembly 100 is shown in side view in FIG. 1, with a single assembly 2 visible. An assembly 2 is mounted on either side of the roof assembly 110 and the floor assembly 130.

The sequence of events in moving the building assembly 100 from a retracted position to an extended position is shown in FIGS. 2 to 7.

Turning to FIGS. 2a and 2b, the building assembly 100 is shown in a retracted position. As shown, the roof members 112, 120 and the floor members 132, 134 are disposed vertically, with the first roof member 112 lying outermost and forming an exterior surface of the building assembly 100. The arms of the assembly 2 are formed to lie within one another when in the retracted position of FIG. 2, in particular with the arms having appropriate flat, 'L'-shaped and V-shaped forms at portions along their lengths. In this way, the assembly 2 occupies the minimum amount of space when in the retracted position.

The assembly 2 is shown in FIGS. 3a and 3b in a first partially extended position, with the third arm 14 and fourth arm 18 having moved away from the fixed pivots 6, 8 and the fixed structure 4. In the movement from the position of FIG. 2 to the position of FIG. 3, the point A at the end of the third arm 14 and the point J at the end of the fourth arm 18 are both following a substantially straight line. It will be noted that the fourth arm 18 is leading the third arm 14 in their motion to the right, as viewed in FIG. 3a.

As shown in FIGS. 3a and 3b, the first roof member 112 is being urged upwards about the hinge assembly 114 by the action of the second roof member 120, with the roller 122 bearing on the track 116 on the first roof member 112.

FIGS. 4a and 4b show the assembly 2 in a second partially extended position, with the third arm 14 and the fourth arm 18 both moved further away from the fixed pivots 6, 8.

Similarly, FIGS. 5a and 5b show the assembly 2 in a third partially extended position, with the third and fourth arms 14, 18 still further from the fixed pivots 6, 8. As can be seen, the floor assembly 130 is being extended by the action of the third arm 14.

FIGS. 6a and 6b show the assembly 2 in a fourth partially extended position, with the third and fourth arms 14, 18 still further from the fixed pivots 6, 8. The point A on the third arm 14 is still following a straight line path.

FIGS. 7a and 7b show the assembly 2 in its extended position, that is with the third arm 14 at a position where the point A is at the end of the straight line path followed from the retracted position. The fourth arm 18 has moved to a substantially horizontal position, as viewed in FIG. 7a, perpendicular to the vertical fixed structure 4.

Further movement of the assembly beyond the extended position shown in FIG. 7 is prevented by the floor assembly 130, which has been extended to a substantially horizontal position.

In the extended position shown in FIGS. 7a and 7b, the roof members 112 and 120 are shown as extending substantially horizontally. The angle of the roof members in the extended position may be altered by varying the length of the arms of the assembly 2, for example to provide a pitched roof to the building assembly.

A seal assembly is preferably provided between the first and second roof members 112, 120, to prevent the ingress of water.

Wall members (not shown for clarity) may be provided to extend between the roof assembly 110 and the floor assembly 130 to fully enclose the space therebetween. The wall members may be mounted in any suitable manner, for example hingedly mounted to the floor members or to the roof members.

Movement of the building assembly from the extended position to the retracted position is the reverse of the motion described above and follows the sequence from FIG. 7 to FIG. 2.

The assembly 2 may be moved by any suitable drive means. For example the drive means may be manually operable or powered by a suitable motor. It has been found that the weight of the components of the floor assembly 130 may be used to drive the entire assembly from the retracted position to the extended position. In such an embodiment, suitable drive means are required only to return the assembly to the retracted position.

Turning to FIG. 8, there is shown a diagrammatical representation of a further embodiment of the present invention. The assembly of this embodiment, generally indicated as 202, has components in common with the assembly of FIG. 1. The common components have been indicated using the same reference numerals as in FIG. 1 and reference is made to the description above in this respect. The assembly 202 of FIG. 8 differs from that of FIG. 1 in the following respects:

The assembly 202 comprises a driving arm 204. The driving arm 204 is pivotally mounted at a first end to the first floor member 132. The second end of the driving arm 204 is slidably mounted to a track 206 extending between the first and second fixed pivots 6, 8 by means of a moveable carriage 210.

The connecting arm 140 has its pivotal connection displaced from the point A on the third arm 14 to a position inwards of the end of the connecting arm 136.

In operation, a force is applied to the carriage 210 as indicated by the arrow R. Movement of the carriage 210 downwards, as viewed in FIG. 8, that is towards the second fixed pivot 8, extends floor assembly 130 and the entire assembly 202 in the directions indicated by the arrows X, Y and Z. The sequence of movement of the components is generally as depicted in FIGS. 2 to 7 and described above.

Movement of the carriage 210 in the reverse or upwards direction, that is towards the first fixed pivot 6, retracts the assembly 202.

It has been found that the provision of the driving arm 204 as shown in FIG. 8 provides freedom to move and stop the assembly at any position between the retracted and extended positions. In particular, the driving arm 204 acts to lift the first floor member 132 from the extended position shown in FIGS. 7a and 7b, overcoming any tendency for the floor assembly 130 to lock in the extended position.

The invention claimed is:

1. An assembly for converting motion, the assembly comprising:
a first arm rotatable at a first position on said first arm about a first fixed pivot;
a second arm rotatable at a first position on said second arm about a second fixed pivot, the second fixed pivot spaced apart from the first fixed pivot;
a third arm pivotably connected at a first position on said third arm to the second arm at a second position on the second arm, the second position spaced apart from the first position on the second arm;
a fourth arm pivotably connected at a first position on said fourth arm to the second arm at a third position on the second arm;
a fifth arm;
a first connecting arm extending between the first arm and the third arm, the first connecting arm pivotably connected at a first position on said first connecting arm to a second position on the first arm spaced apart from the first position on the first arm and pivotably connected at a second position on said first connecting arm to the third arm at a second position on said third arm spaced apart from the first position on said third arm;
a second connecting arm extending between the first arm and the second arm, the second connecting arm pivotably connected at a first position on said second connecting arm to a third position on the first arm disposed between the first and second positions on said first arm and pivotably connected at a second position on said second connecting arm to a fourth position on the second arm;
a third connecting arm extending between the first arm and the fourth arm and between the fourth arm and the fifth arm, the third connecting arm pivotably connected at a first position on said third connecting arm to a fourth position on the first arm, pivotably connected at a second position on said third connecting arm to a third position on the fourth arm, and pivotably connected at a third position on said third connecting arm to a first position on the fifth arm; and
a fourth connecting arm pivotably connected at a first position on said fourth connecting arm to the fourth arm at a second position on the fourth arm and pivotably connected at a second position on said fourth connecting arm to the fifth arm at a second position on the fifth arm;

the fifth arm pivotably connected at a second position on said fifth arm to the third connecting arm;

the fifth arm being mounted to an object to be moved.

2. The assembly according to claim 1, wherein drive is applied to one or both the first and second arms, resulting in motion of the third and fourth arms.

3. The assembly according to claim 1, wherein drive is applied to one or both of the third and fourth arms, resulting in motion of the first and second arms.

4. The assembly according to claim 3, wherein drive is applied indirectly to the third or fourth arm, the drive being applied to an object connected to the said arm and to be moved by the said arm.

5. The assembly according to claim 1, wherein the first position on the first arm is at or adjacent an end of the first arm, the first position on the second arm is at or adjacent an end of the second arm, the second position on the second arm is at or adjacent an end of the second arm, the first position on the third arm is at or adjacent an end of the third arm, and the first position on the fourth arm is at or adjacent an end of the fourth arm.

6. The assembly according to claim 1, wherein the length of the first arm is no greater than the distance between the first and second fixed pivots.

7. The assembly according to claim 1, wherein the length of the second arm is no greater than the distance between the first and second fixed pivots.

8. The assembly according to claim 1, wherein the length of the first and second arms is substantially the same.

9. The assembly according to claim 1, wherein the length of the third arm is no greater than the length of the first and/or the second arms, and the length of the fourth arm is no greater than the length of the first and/or second arms.

10. The assembly according to claim 1, wherein the pivotable connection between the first connecting arm and the first arm is at or adjacent an end of the first connecting arm, the second position on the first arm is at or adjacent an end of the first arm, the pivotable connection between the second connecting arm and the first arm is at or adjacent an end of the second connecting arm, and the pivotable connection between the second connecting arm and the second arm is at or adjacent an end of the second connecting arm.

11. The assembly according to claim 1, wherein the fourth position on the second arm coincides with the second position on the second arm, such that the second connecting arm is connected to both the second and third arms.

12. The assembly according to claim 1, wherein the fourth position on the first arm is at or adjacent an end of the first arm, the second and fourth positions on the first arm coincide, the pivotable connection between the third connecting arm and the fifth arm is at or adjacent an end of the third connecting arm, and the fourth position on the second arm coincides with the third position on the second arm, such that the second connecting arm is connected to both the second and fourth arms.

13. The assembly according to claim 1, wherein the second third and fourth positions on the second arm coincide, such that the second connecting arm is connected to all of the second, third and fourth arms.

14. The assembly according to claim 1, wherein the second position on the fourth arm is at or adjacent an end of the fourth arm.

15. The assembly according to claim 1, wherein one arm or connecting arm is slidably connected to another arm or connecting arm.

16. The assembly according to claim 15, wherein the one arm or connecting arm is provided with a member slidably mounted on said one arm or connecting arm, the member being pivotally connected to the other arm or connecting arm.

17. An assembly comprising a first component, a second component and a third component, the second and third components being arranged for movement with respect to the first component, wherein the assembly according to claim 1 is provided between the first component and the second and third components, operation of the assembly providing movement of the second and third components with respect to the first component.

18. The assembly according to claim 17, wherein the second component is moveable in a linear motion with respect to the first component between a retracted position and an extended position, and the third component is moveable with respect to the first component in a pattern that displaces and rotates the third component with respect to the first component.

19. A building comprising:
a first building portion, a second building portion and a third building portion, the second building portion being moveable relative to the first building portion between a retracted position and a first extended position and the third building portion being moveable relative to the first building portion between a retracted position and a second extended position;
wherein relative movement between the first, second and third building portions and support of the second and third building portions with respect to the first building portions are provided by the assembly according to claim 1.

20. The building according to claim 19, wherein the second building portion is a roof assembly and the third building portion is a floor assembly, the roof assembly connected to the fifth arm and the floor assembly connected to the third arm.

* * * * *